United States Patent
Smerzi

(10) Patent No.: US 10,393,601 B2
(45) Date of Patent: Aug. 27, 2019

(54) SWITCHED-RESISTOR SENSOR BRIDGE, CORRESPONDING SYSTEM AND METHOD

(71) Applicant: STMicroelectronics S.r.l., Agrate Brianza (IT)

(72) Inventor: Santo Alessandro Smerzi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 222 days.

(21) Appl. No.: 15/437,615

(22) Filed: Feb. 21, 2017

(65) Prior Publication Data
US 2017/0356813 A1 Dec. 14, 2017

(30) Foreign Application Priority Data
Jun. 13, 2016 (IT) .................. 102016000060487

(51) Int. Cl.
*G01K 7/16* (2006.01)
*G01L 1/18* (2006.01)
(Continued)

(52) U.S. Cl.
CPC .............. *G01L 1/2262* (2013.01); *G01K 7/16* (2013.01); *G01L 1/18* (2013.01); *G01L 1/2287* (2013.01); *G01L 9/0052* (2013.01)

(58) Field of Classification Search
CPC ....... G01L 1/2262; G01L 1/2287; G01L 1/18; G01L 9/0052; G01K 7/16
See application file for complete search history.

(56) References Cited

U.S. PATENT DOCUMENTS 4,125,023 A * 11/1978 Amemiya .............. G01K 1/028
  374/163
4,201,088 A * 5/1980 Trietley, Jr. ............ G01D 1/10
  374/114

(Continued)

OTHER PUBLICATIONS

Koay Kuan Chuang et al: A Low-Power Resistance-to-Frequency Converter Circuit With Wide Frequency Range, IEEE Transactions on Instrumentation and Measurement, IEEE Service Center, Piscataway, NJ, US, vol. 64, No. 12, Dec. 1, 2015, pp. 3173-3182—XP011589138.

(Continued)

*Primary Examiner* — Jonathan M Dunlap
(74) *Attorney, Agent, or Firm* — Crowe & Dunlevy

(57) ABSTRACT

A MEMS pressure sensor includes a resistive sensing bridge with a first sensing resistor and a second sensing resistor, each having variable resistance values in response to change in a sensed physical variable. An oscillator generates an oscillation signal with a frequency or period that is a function of an oscillator control signal. A sensor reference module generates the oscillator control signal as a function of the resistance value of a resistor coupled therewith. This sensor reference module is couplable with the first sensing resistor or second sensing resistor. A processing circuit coupled to the oscillator provides a sensor signal indicative of the frequency or period of the oscillation signal. The sensor signal has first and second values with the sensor reference module coupled with the first sensing resistor and with the second sensing resistor, respectively, the first and second values being thus jointly indicative of the physical variable sensed.

20 Claims, 13 Drawing Sheets

(51) Int. Cl.
*G01L 1/22* (2006.01)
*G01L 9/00* (2006.01)

(56) References Cited

U.S. PATENT DOCUMENTS

| | | | | |
|---|---|---|---|---|
| 4,210,024 A * | 7/1980 | Ishiwatari | ............ | G01D 3/0365 374/1 |
| 4,296,413 A | 10/1981 | Milkovic | | |
| 4,442,344 A * | 4/1984 | Yasuda | ................ | H05B 6/6411 219/497 |
| 4,471,354 A * | 9/1984 | Smith | ................ | A61B 5/0008 128/903 |
| 4,616,173 A * | 10/1986 | Cook | .................... | G01R 23/10 324/76.16 |
| 5,525,040 A * | 6/1996 | Andreae | ............. | E21B 47/0007 417/12 |
| 6,469,525 B2 * | 10/2002 | Baiardo | ................ | G01N 27/223 324/667 |
| 6,536,578 B1 * | 3/2003 | Ashley | .................... | G07D 5/08 194/318 |
| 6,629,776 B2 * | 10/2003 | Bell | ....................... | G01K 7/245 340/539.1 |
| 8,573,842 B2 * | 11/2013 | Shao | .................... | G01N 27/028 374/143 |
| 2002/0105436 A1 * | 8/2002 | Bell | ....................... | G01K 7/245 340/870.17 |
| 2003/0005780 A1 * | 1/2003 | Pahl | ........................ | G01L 3/106 73/862.326 |
| 2005/0087019 A1 * | 4/2005 | Face | ......................... | G01N 29/14 73/649 |
| 2005/0109115 A1 * | 5/2005 | Gatesman | ................ | G01L 9/125 73/753 |
| 2005/0261842 A1 * | 11/2005 | Yamagishi | .............. | G01F 1/684 702/45 |
| 2014/0086279 A1 * | 3/2014 | Cao | ....................... | G01K 1/026 374/183 |
| 2014/0119403 A1 * | 5/2014 | Moon | ...................... | G01K 7/32 374/117 |
| 2015/0192487 A1 * | 7/2015 | Belov | ................ | B81C 1/00158 73/754 |
| 2015/0295562 A1 * | 10/2015 | Agarwal | ................ | H03K 3/354 73/23.3 |
| 2015/0300889 A1 * | 10/2015 | Ramaraju | ................ | G01K 7/01 374/170 |
| 2017/0038269 A1 * | 2/2017 | Hio | ........................ | G01L 9/0048 |
| 2018/0149527 A1 * | 5/2018 | Lu | ............................ | G01K 7/01 |
| 2018/0150031 A1 * | 5/2018 | Caffee | ................... | G04F 10/005 |

OTHER PUBLICATIONS

IT Search Report and Written Opinion for IT 102016000060487 dated Feb. 6, 2017 (8 pages).
A. A. Abidi: "Phase Noise and Jitter in CMOS Ring Oscillators," IEEE J. Solid-State Circuits, vol. 41, pp. 1803-1816, Aug. 2006.
C. Liu et al.: "Jitter in oscillators with 1/f noise sources," in Proc. IEEE Int. Symp. Circuits and Systems (ISCAS), 2004, pp. 773-776.
J. McNeill: "Jitter in ring oscillators," IEEE ISCS '94.
J. McNeill: "Jitter in ring oscillators," IEEE J. Solid-State Circuits, vol. 32, pp. 870-879, Jun. 1997.
LPS331AP MEMS pressure sensor, 260-1260 mbar absolute digital output barometer, ST Datasheet, Mar. 2012.

* cited by examiner

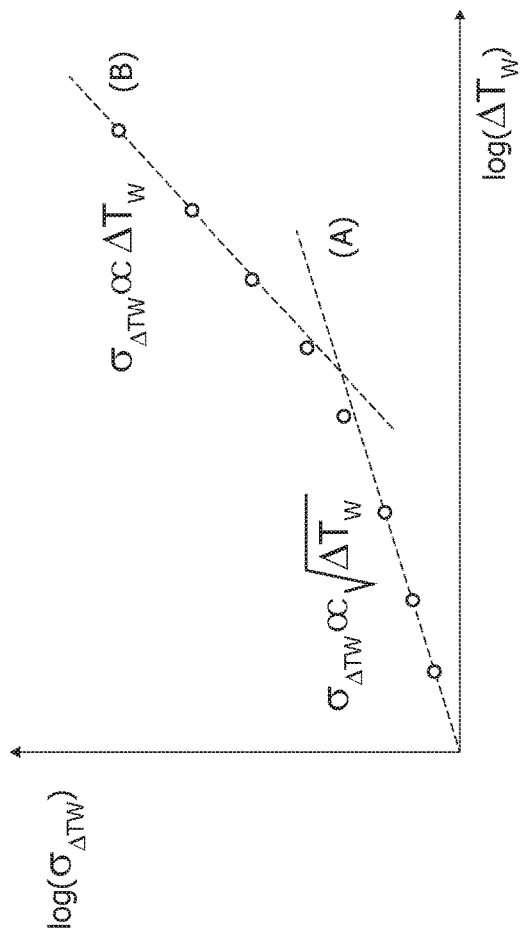
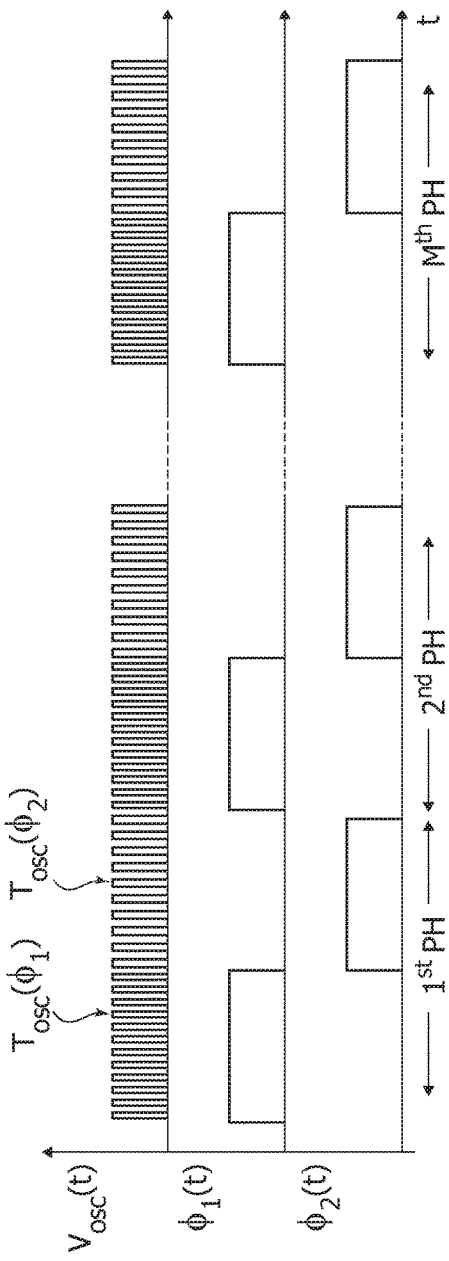

SWITCHED-RESISTOR SENSOR BRIDGE, CORRESPONDING SYSTEM AND METHOD

PRIORITY CLAIM

This application claims the priority benefit of Italian Patent Application Number 102016000060487, filed on Jun. 13, 2016, the disclosure of which is hereby incorporated by reference in its entirety.

TECHNICAL FIELD

The description relates to sensor bridges.

One or more embodiments may apply, for example, to sensor electronics such as pressure sensors, strain gauges, load cells, temperature sensors and the like.

One or more embodiments may apply, for example, to sensor electronic interfaces with reduced dimensions, low supply voltage and low power consumption characteristics for use, for example, in portable, remote and wireless electronic systems for domestic, industrial, biomedical, automotive and consumer applications.

BACKGROUND

While signal conditioning techniques for resistive sensors based on the Wheatstone bridge (WB) circuit are widely used, a Wheatstone bridge configuration may not facilitate achieving low-voltage and low power consumption characteristics.

The sensitivity of a Wheatstone bridge may in fact be of the order of few mV/V (output voltage/excitation voltage), and high excitation voltages and amplification plus filtering stages may be used in order to enhance the signals to the proper input dynamic range of analog to digital converters. This may introduce noise, nonlinearities and increase the overall power consumption.

Moreover, current consumption of a Wheatstone bridge may be high (for example, in the order of mA or higher) and cannot be easily reduced by designing high-resistive sensors, insofar as the resistance of resistive sensors depend on the physical characteristics of the sensor and the physical environment to be measured.

There is a need in the art to dispense with the drawbacks outlined in the foregoing.

SUMMARY

According to one or more embodiments, a switched-resistor sensor bridge is presented.

Sensor electronics such as, for example, MEMS pressure sensors, strain gauges, load cells, temperature sensors and the like for use in, for example, portable, remote and wireless electronic systems for domestic, industrial, biomedical, automotive and consumer applications may be exemplary of devices including one or more embodiments.

One or more embodiments may relate to: a corresponding sensor system, and/or a corresponding method.

One or more embodiments may provide a Switched-Resistor Sensor Bridge (briefly SRSB) wherein the sensor resistive variations of a switched-resistor configuration may be converted into the time (period) or frequency of a signal generated by an oscillator.

In one or more embodiments, sensing information may no longer be conveyed by the amplitude of a voltage signal but rather by a time period or a frequency, which can be filtered in the time-discrete domain and digitized.

One or more embodiments may not require high excitation voltages in order to improve the sensitivity and/or may not involve an amplification stage. In one or more embodiments, currents in a switched-resistor branches could be of the order of µAmps.

One or more embodiments may thus facilitate providing low-voltage, low-power consumption solutions, while at the same time providing performance comparable with a conventional Wheatstone bridge configuration in terms of sensitivity, linearity and rejection of common-mode noise and rejection of temperature dependence of resistivity.

One or more embodiments may offer one or more of the following advantages:

- performance comparable to a sensor signal conditioning system based on a Wheatstone bridge in providing compensation of temperature dependence of resistivity, good linearity, rejection of common mode noise;
- use of (high) excitation voltages may be avoided, which results in low-voltage, low-power consumption;
- use of amplification stages may be similarly avoided, which results in less noise and less power consumption;
- time-to-digital/frequency-to-digital conversion may be easier to implement in comparison with conventional analog-to-digital conversion of a voltage signal (for example, SAR, . . . );
- current consumption of switched-resistive branches of the order of µAmps may be achieved in comparison with current consumption in a Wheatstone bridge in the order of mAmps, thus providing reduced power consumption;
- a low power consumption may facilitate providing a passive wireless sensor network where passive sensor nodes are powered and controlled by an active RF reader;
- accuracy may be flexibly enhanced by resorting to a N-cycle count window and/or a number M of conversion phases for a longer conversion time.

BRIEF DESCRIPTION OF THE DRAWINGS

One or more embodiments will now be described, by way of example only, with reference to the annexed figures, wherein:

FIG. 8 is a diagram of time jitter in an oscillator;

FIG. 9 is a diagram exemplary of possible operation of one or more embodiments;

DETAILED DESCRIPTION OF THE DRAWINGS

In the ensuing description, one or more specific details are illustrated, aimed at providing an in-depth understanding of examples of embodiments of the instant description. The embodiments may be obtained by one or more of the specific details or with other methods, components, materials, and so on. In other cases, known structures, materials or operations are not illustrated or described in detail so that certain aspects of embodiment will not be obscured.

Reference to "an embodiment" or "one embodiment" in the framework of the present description is intended to indicate a particular configuration, structure, characteristic described in relation to the embodiment is compliance in at least one embodiment. Hence, phrases such as "in an embodiment" or "in one (or more) embodiments" that may be present in one or more points in the present description do not necessarily refer to one and the same embodiment. Moreover, particular conformation, structures or characteristics as exemplified in connection with any of the figures may be combined in any other quite way in one or more embodiments as possibly exemplified in other figures.

The references used herein are provided merely for convenience and hence do not define the extent of protection or the scope of the embodiments.

One or more embodiments may relate to signal conditioning in, for example, "smart" sensor systems.

Such a smart sensor system may include a sensor with an inherent intelligence as provided, for example, by associated electronic interfaces. These may include a signal conditioning chain from a sensor S to an analog-to-digital conversion block ADC, possibly in combination with other blocks such as, for example, power management, memories, microcontrollers and actuators.

Figure 1:
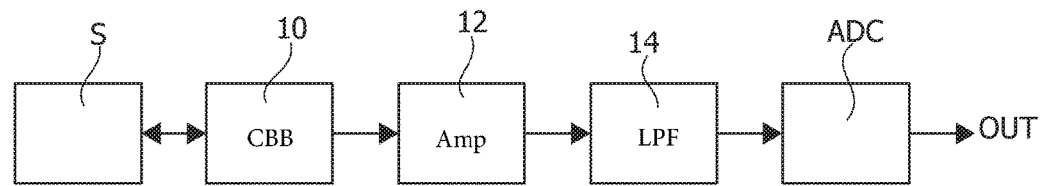
FIG. 1 is an exemplary representation of a signal conditioning chain for a sensor system.

In FIG. 1 is a block diagram of a signal conditioning system coupled with a sensor S and including (in a manner known per se) a conditioning and biasing block (CBB) 10, an amplifier (Amp) 12 to amplify the output signal from the block 10, and a low-pass filter (LPF) 14 for low-pass filtering the output signal from the block 10 as amplified by the amplifier 12 and feeding the low-pass filtered signal to an analog-to-digital conversion block ADC.

Electronic circuits as included in such a signal conditioning system may provide a sensor interface for reading out the information conveyed by the signal generated by the sensor S and generating an output signal OUT to be displayed and/or to be further processed.

As indicated, the need is felt for sensor electronic interfaces exhibiting reduced dimensions, low supply voltage and low power consumption characteristics for use, for example, in portable, remote and wireless electronic systems for domestic, industrial, biomedical, automotive and consumer applications.

The following are exemplary of features appreciated for sensor interfaces:
high sensitivity and resolution;
high dynamic range;
good linearity;
high precision and accuracy;
low input noise and offset;
long-term temperature stability;
reduced silicon area;
low effect of parasitic capacitances; and
facilitated calibration and compensation of the transducer characteristics.

Resistive elements may be used as sensors sensitive to temperature, strain, light. Using resistive elements, physical phenomena can be measured, such as fluid or mass flow, relative humidity, forces and strains.

Depending, for example, on sensor design and the physical environment to be measured, sensor resistance values may range from less than 100 Ohm to several hundred kOhms.

Table I below is exemplary of resistance values for different sensors.

TABLE I

| Sensor | resistance value |
| --- | --- |
| strain gauges | 120 Ohm, 350 Ohm, 3500 Ohm |
| load cells | 350 Ohm-3500 Ohm |
| pressure sensors | 350 Ohm-3500 Ohm |
| relative humidity | 100 kOhm-10 MOhm |
| resistance temperature devices (RTD's) | 100 Ohm-1000 Ohm |
| Thermistors | 100 Ohm-10 MOhm |

Resistive sensors such as Resistance Temperature Devices (RTD's) and strain gauges produce relatively small percentage changes in resistance (typically less than 1%) over the entire operating range, in response to a change in the physical variable such as temperature or force. Hence, accurately measuring small resistive changes is critical when applying resistive sensors.

An interface circuit extensively used in resistive sensors is based on a Wheatstone bridge configuration. This simple basic solution is capable of converting an impedance (for example, a resistance) variation into a voltage variation.

Figure 2:
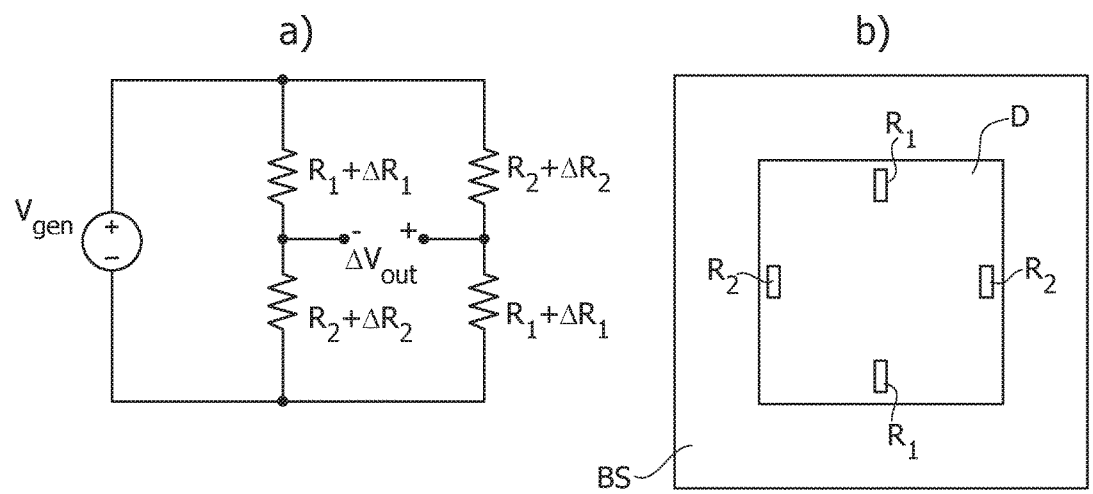
FIG. 2, including two portions designated a) and b), respectively, is exemplary of a piezoresistor bridge integrated on a silicon membrane for a pressure sensor.

An exemplary Wheatstone bridge (WB) configuration is a piezoresistor bridge for pressure sensors which corresponds to the electrical circuit shown in FIG. 2, part a) and may include four piezoresistors $R_1$, $R_2$ diffused on a silicon diaphragm D implemented on bulk silicon (BS). This Wheatstone bridge configuration may be adopted, for example, in integrated MEMS-based pressure sensors. The mechanical strain generated by external pressure may be sensed as piezoresistive variations $\Delta R$ that unbalance the bridge. The main characteristics of a Wheatstone bridge in terms of sensitivity, linearity and offset may be defined by referring to the exemplary layout of FIG. 2.

The differential output voltage generated by the piezoresistive unbalance may be expressed as:

$$\Delta V_{out} = \frac{\left(\frac{\Delta R_1}{R_1}\right) - \left(\frac{\Delta R_2}{R_2}\right)}{2 + \left(\frac{\Delta R_1}{R_1}\right) + \left(\frac{\Delta R_2}{R_2}\right)} \cdot V_{gen} \quad (1)$$

$$\frac{\Delta V_{out}}{V_{gen}} \approx \frac{1}{2} \cdot \left[\left(\frac{\Delta R_1}{R_1}\right) - \left(\frac{\Delta R_2}{R_2}\right)\right] + \frac{1}{4} \cdot \left[\left(\frac{\Delta R_2}{R_2}\right)^2 - \left(\frac{\Delta R_1}{R_1}\right)^2\right] \quad (2)$$

In Eq. (2) the first term is the linear sensitivity of the WB, and the second term represents the non-linearity. Therefore:
- in the absence of mismatches, temperature dependence of resistivity may be fully compensated;
- the non-linearity error may be minimized if the bridge is symmetrically unbalanced, i.e., $(\Delta R_1/R_1)=-(\Delta R_2/R_2)$
- common-mode noise and disturbances are rejected by a differential structure in case of ideally matched piezoresistors $R_1$ and $R_2$.

Offset in a Wheatstone bridge is generated by mismatch between the "unforced" (that is un-stressed) resistors $R_1$, $R_2$, that is:

$$R_1 = R_0 + \frac{\delta R}{2}$$

$$R_2 = R_0 - \frac{\delta R}{2}$$

Hence, the sensitivity of a mismatched Wheatstone bridge may be expressed as:

$$\frac{\Delta V_{out}}{V_{gen}} \approx \frac{1}{2} \cdot \left[\left(\frac{\Delta R_1}{R_1}\right) - \left(\frac{\Delta R_2}{R_2}\right)\right] + \quad (3)$$

$$\frac{1}{4} \cdot \left[\left(\frac{\Delta R_2}{R_2}\right)^2 - \left(\frac{\Delta R_1}{R_1}\right)^2\right] + \frac{\delta R}{2R_0} \cdot \left[1 - \frac{\left(\frac{\Delta R_1}{R_1}\right) + \left(\frac{\Delta R_2}{R_2}\right)}{2}\right]$$

The temperature dependence of the resistors may be modeled as:

$$\frac{\Delta R}{R} = \alpha_1 \cdot \Delta Temp + \alpha_2 \cdot (\Delta Temp)^2 + \ldots$$

$$\Delta Temp = Temp - Temp_{ref}$$

where $\alpha i$ are the temperature coefficients of resistance and $\Delta Temp$ is the difference between the operative temperature $Temp$ and the reference temperature $Temp_{ref}$. Therefore, resistor mismatch generates a temperature-dependent offset at the output of WB:

$$\left(\frac{\Delta V_{out}}{V_{gen}}\right)_{offset} = \frac{\delta R}{2R_0} \cdot [1 - \alpha_1 \cdot \Delta Temp - \alpha_2 \cdot (\Delta Temp)^2 + \ldots] \quad (4)$$

As indicated, sensor systems based on a Wheatstone bridge configuration may suffer from a number of drawbacks.

For instance, for low resistivity variations $\Delta R/R$, (for example, piezoresistive variations in pressure sensors may be of the order of a few percent or below) the bridge sensitivity expressed in Eq. (2) may be of the order of few mV/V (output voltage/excitation voltage).

Therefore, obtaining readable values for the output voltage across the bridge $\Delta V_{out}$ may be facilitated by a large bias voltage $V_{gen}$ (for example, a bias voltage of 10V in load cell applications), which militates against low-voltage operation and may lead to considerable power consumption of the bridge.

Also, high values for resistivity decrease the current consumption of the bridge but enhance the noise level, thus degrading the signal-to-noise ratio in $\Delta V_{out}$. For example, possible values are 0.3÷3 kΩs for piezoresistors in pressure sensors with a bias current in the order of mAmps.

As shown in Table I above, the resistance values of resistive sensors may depend on the physical characteristics of the sensor and the physical environment to be measured.

As a further point, the signal $\Delta V_{out}$ may not be suitable to be directly applied to an ADC converter without being amplified and filtered. The amplifier/filter chain introduces noise, nonlinearities and increase the overall power consumption.

The various points outlined in the foregoing may thus militate against the use of Wheatstone bridges in those applications where voltage levels and current consumption are limited, such as, for example, in battery-less passive wireless sensor systems.

This may apply, for instance, to sensor systems for structural health monitoring (SHM). Sensors for SHM applications are expected to operate for years, therefore very low power consumption is preferred feature when energy is expected to be supplied via a battery or harvesting (for example, solar, vibrational, electromagnetic).

Also, metallic or semiconductor strain gauges in Wheatstone bridge configuration are widely used to measure the strain of materials due to an applied force.

Figure 3:
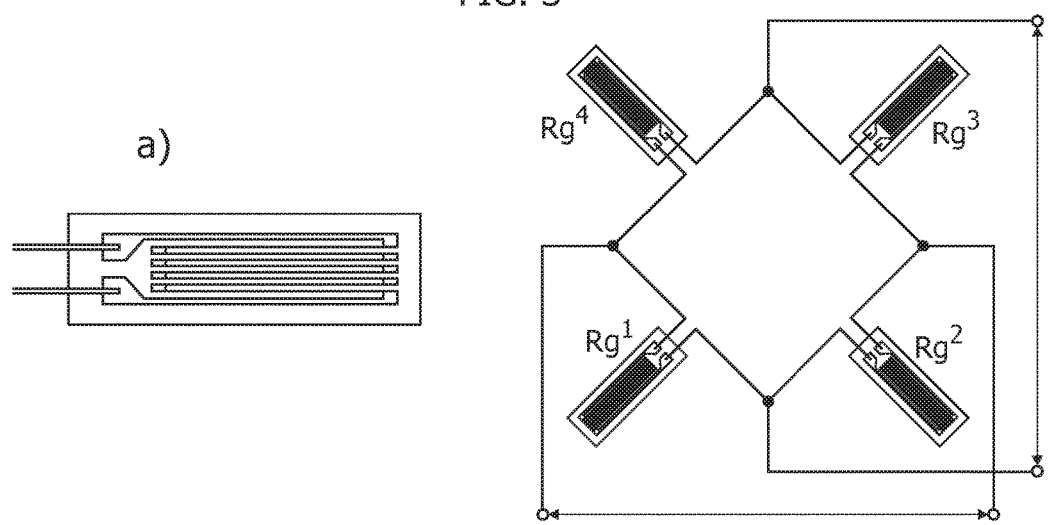
FIG. 3, again including two portions designated a) and b), respectively, is exemplary of a serpentine-type coil strain sensor and a strain gauge in Wheatstone bridge configuration.

FIG. 3 is exemplary of a strain gauge in a serpentine-type coil strain configuration (portion a) and in a Wheatstone bridge configuration including four elements $R_g^1$, $R_g^2$, $R_g^3$, $R_g^4$ (portion b).

The product designated LPS331AP commercially available from STMicroelectronics (see, for example, "LPS331AP MEMS pressure sensor, 260-1260 mbar absolute digital output barometer," ST Datasheet, March 2012, incorporated by reference) is a MEMS monolithic pressure sensor adopting a piezoresistive structure in a Wheatstone bridge configuration integrated on top a silicon membrane.

Figure 4:
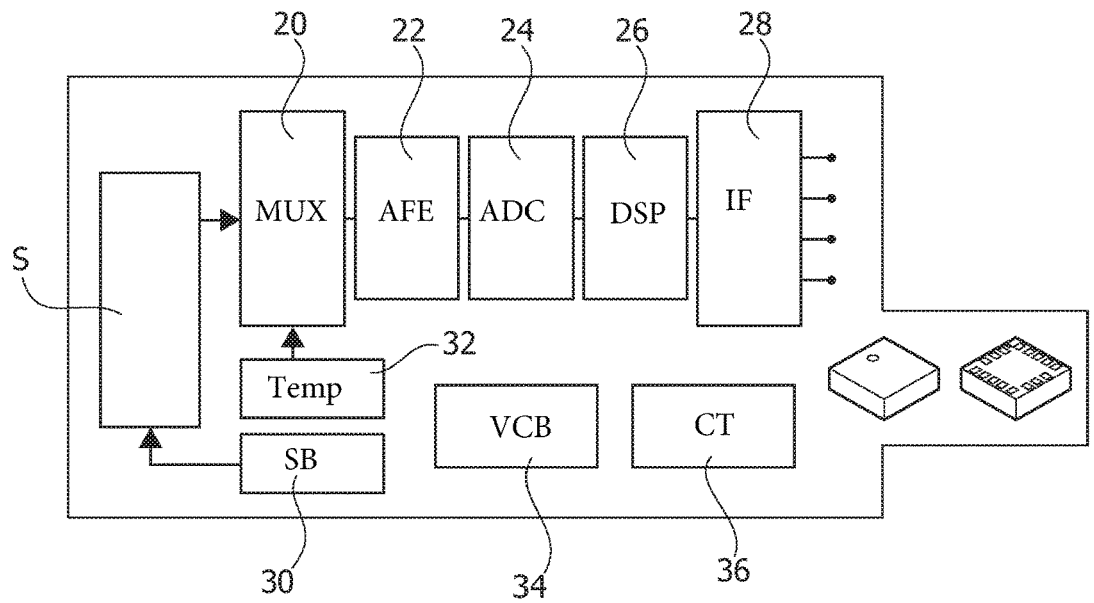
FIG. 4 is an exemplary block diagram of a MEMS (Micro Electro-Mechanical Systems) pressure sensor.

FIG. 4 is a block diagram of the ST LPS331AP MEMS pressure sensor.

The following designations apply to the blocks shown in FIG. 4:
- S—sensing element, including a Wheatstone bridge configuration
- 20—MUX to select output between the piezoresistive sensing element S and a temperature sensor 32
- 22—low-noise analog front end (AFE)
- 24—ADC plus digital filter
- 26—Digital Signal Processor—DSP for temperature compensation
- 28—I²C/SPI serial interfaces (IF)
- 30—sensor bias (SB)
- 32—temperature sensor (Temp)
- 34—voltage and current bias (VCB)
- 36—clock and timing (CT).

One or more embodiments may provide a Switched-Resistor Sensor Bridge (briefly SRSB) arrangement for use, for example, in a MEMS pressure sensor, namely a system which may provide a low-voltage, low-power consumption signal conditioning techniques to measure the resistive variations of a resistive sensor.

In one or more embodiments, the resistive variations in the sensor may be converted into time or frequency variations of an electrical signal.

In one or more embodiments, such a system may provide operation comparable with operation of a signal conditioning system based on a conventional Wheatstone bridge.

Figure 5:
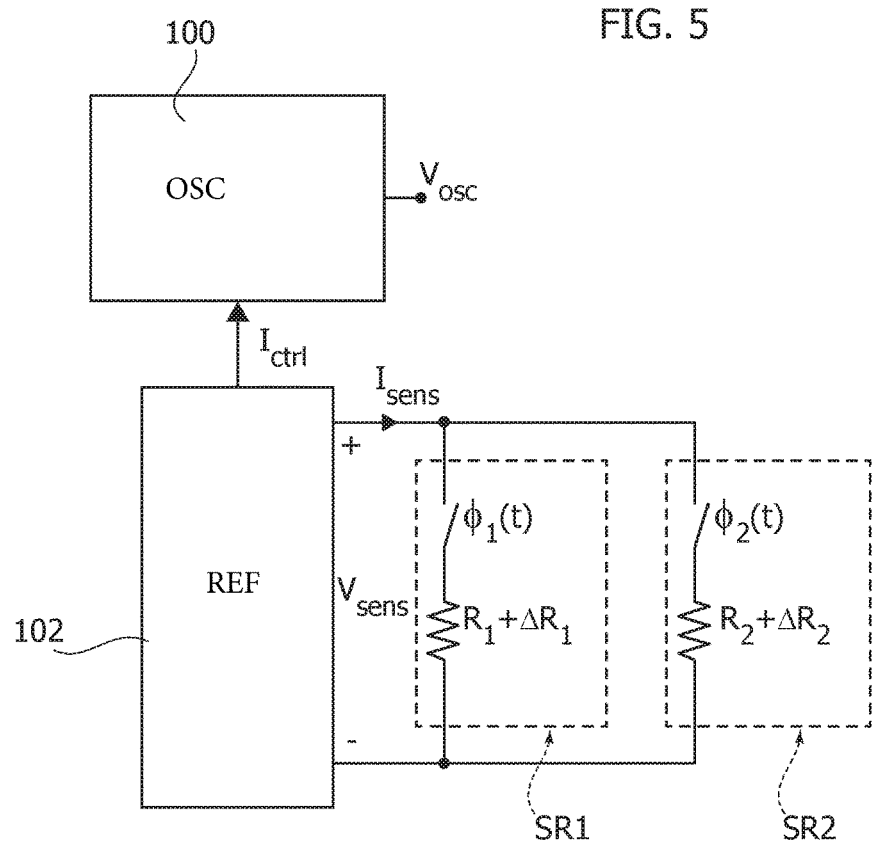
FIG. 5 is a block diagram of one or more embodiments.

In one or more embodiments, such a system (SRSB), as shown in FIG. 5 may include (at least) one pair of switched resistive branches SR1, SR2, including respective sensing resistors $R_1$, $R_2$, which may be, for example, piezoresistors diffused on a membrane of a MEMS integrated pressure sensor.

Figure 18:
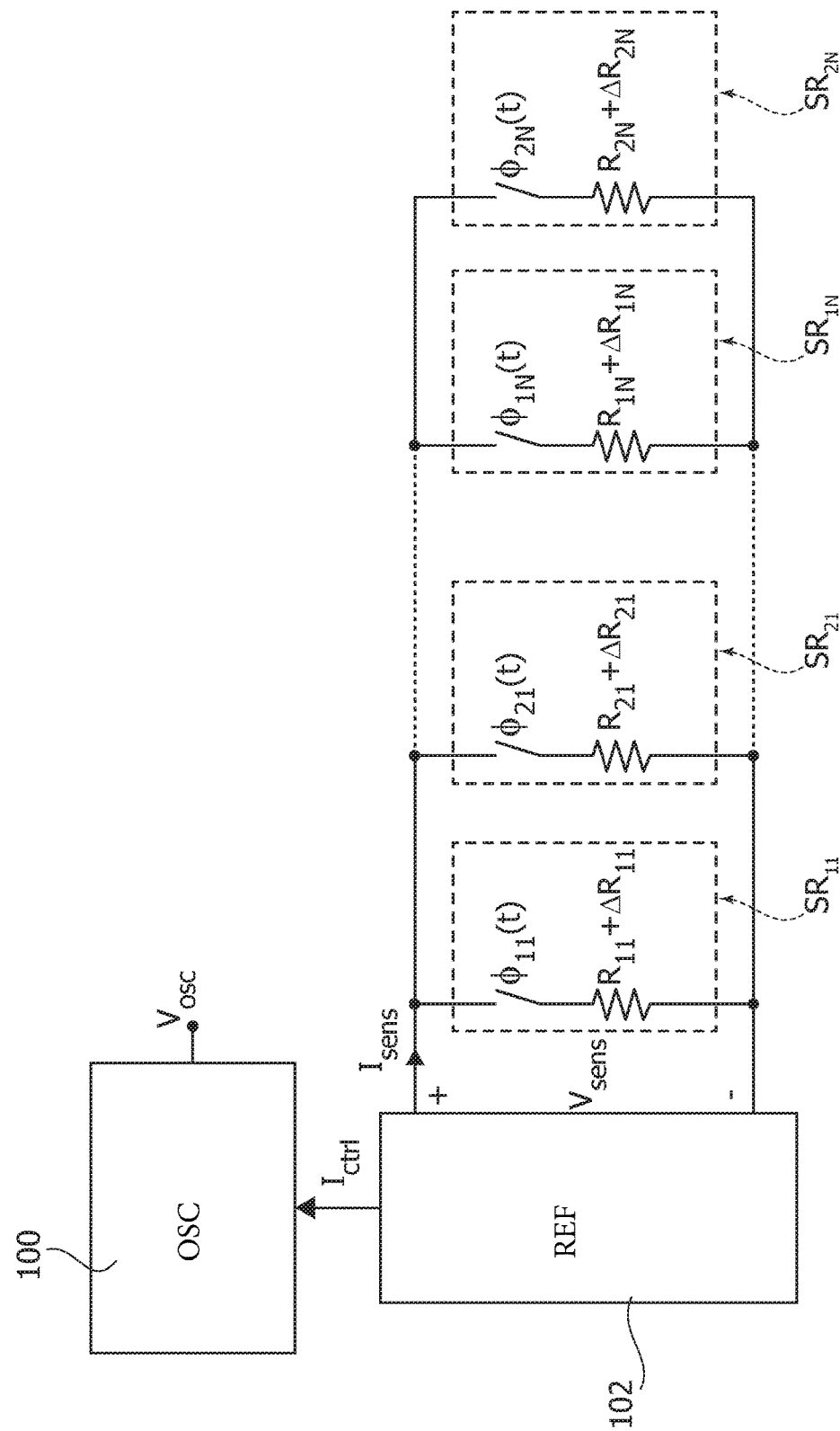
FIG. 18 is a block diagram of one or more embodiments including a plurality of switched resistor pairs.

One or more embodiments, as exemplified, for example, in FIG. 18, may include plural pairs of such switched resistive branches. For the sake of simplicity and ease of explanation the following detailed description will refer to embodiments including only one pair of switched resistive branches SR1 and SR2.

The branches SR1, SR2 may be termed "switched" insofar as they include respective switches—for example, semiconductor switches such as MOSFETs—each coupled (for example, in series) with one of the resistors $R_1$, $R_2$.

In one or more embodiments, these switches may be controlled as discussed in the following between an "on" (that is conductive) state or phase and an "off" (that is non-conductive) state or phase: consequently, these switches will be referred to herein simply as $\Phi_1(t)$, $\Phi_2(t)$.

In one or more embodiments, the system shown in FIG. 5 may include an oscillator (OSC) 100.

In one or more embodiments, the oscillator 100 may include a controlled oscillator (for example, a current-controlled oscillator) configured for generating an oscillating signal (for example, a voltage signal) $V_{osc}$ with a frequency $F_{osc}$ (and a period $T_{osc}$) which is a function (for example, proportional) to a control signal (for example, a current $I_{ctrl}$).

In one or more embodiments, the system shown in FIG. 5 may include a sensor reference (REF) block 102 (for example, a voltage reference block), configured for providing:
- a first controlled, sensor-independent, signal (for example, a voltage signal $V_{sens}$) to the switched-resistive branches SR1, SR2,
- a second, sensor-dependent, signal (for example, a current signal $I_{sens}$) to the switched-resistive branches; and
- a third, sensor-dependent, signal (for example, a current signal $I_{ctrl}$ which is a function of the signal $I_{sens}$) to the controlled oscillator block 100.

If $R_{sens}$ is the resistance of one switched-resistive branch SR1, SR2 and $K_c$ is the gain of the (for example, current-controlled) oscillator 100 (for example, gain expressed in Hz/Amp), and assuming for the sake of simplicity that $I_{ctrl}=I_{sens}$:

$$I_{sens} = \frac{V_{sens}}{R_{sens}}$$

$$T_{osc} = \frac{R_{sens}}{K_c \cdot V_{sens}}$$

$$F_{osc} = \frac{K_c \cdot V_{sens}}{R_{sens}}$$

In one or more embodiments, a switched-resistor sensor Bridge (SRSB) as exemplified in FIG. 5 may include, coupled with the switched resistive branches SR1 (for example, $R_1$ and $\Phi_1(t)$) and SR2 (for example, $R_2$ and $\Phi_2(t)$), a "dual" arrangement wherein:
- the oscillator 100 includes a voltage-controlled oscillator in the place of a current-controlled oscillator; and
- the reference block 102 includes a sensor current reference in the place of a sensor voltage reference.

In such a "dual" implementation, the reference block 102 may provide a controlled, sensor-independent current $I_{sens}$ to the switched-resistive branches SR1, SR2; a sensor-dependent voltage $V_{sens}$ to the switched-resistive branches SR1, SR2; a sensor-dependent voltage $V_{ctrl}$, which is a function of $V_{sens}$, to the voltage-controlled oscillator block 100.

As indicated, one or more embodiments (see, for example, FIG. 18) may include plural pairs of switched resistive branches $SR1i$ and $SR2i$ (for example, $SR_{11}$, $SR_{22}$ to $SR_{1N}$, $SR_{2N}$) in series or parallel configurations.

Figure 6:
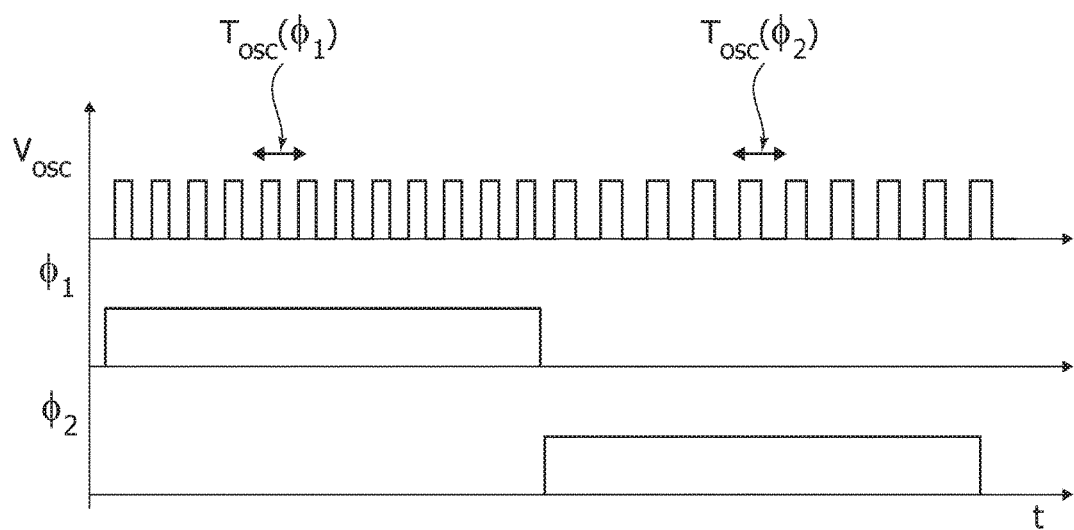
FIGS. 6 and 7 are time diagrams exemplary of signals in one or more embodiments.

In one or more embodiments, operation of a switched-resistor sensor bridge (SRSB) as exemplified herein may include two phases as illustrated in FIG. 6. Again, embodiments including only one pair of switched resistive branches SR1 and SR2 will be discussed for the sake of simplicity and ease of explanation.

In a first phase (Phase 1) the branch SR1 may be enabled (that is, with $\Phi_1(t)$ conductive or "on") and the branch SR2 disabled (that is, with $\Phi_2(t)$ non-conductive or "off"), so that variations ($\Delta R_1/R_1$) are time/frequency converted into $T_{osc}(\Phi_1)/F_{osc}(\Phi_1)$.

In a second phase (Phase 2) the branch SR2 may be enabled (that is, with $\Phi_2(t)$ conductive or "on") and the branch SR1 disabled (that is, with $\Phi_1(t)$ non-conductive or "off"), so that variations ($\Delta R_2/R_2$) are time/frequency converted into $T_{osc}(\Phi_2)/F_{osc}(\Phi_2)$.

In one or more embodiments, the output from the switched-resistor bridge may be given by an algebraic expression of time/frequency (variations) $T_{osc}(\Phi_i)/F_{osc}(\Phi_i)$ between the phases.

An algebraic expression is a well know designation used in mathematics to designate an expression formed on the basis of the algebraic operations (addition, subtraction or difference, multiplication, division and exponentiation).

In the following, the difference will be considered as exemplary of such an algebraic operation, being otherwise understood that the embodiments are not limited to the possible use of subtraction or difference.

For example, in one or more embodiments, the output from the switched-resistor sensor bridge (SRSB) may be given by the difference of time/frequency (variations) between the two phases, for example, (assuming again, for the sake of simplicity that $I_{ctrl}=I_{sens}$):

$$\Delta T_{osc} = T_{osc}(\Phi_1) - T_{osc}(\Phi_2) = \frac{R_1}{K_c \cdot V_{sens}} \cdot \left[1 + \left(\frac{\Delta R_1}{R_1}\right)\right] - \frac{R_2}{K_c \cdot V_{sens}} \cdot \left[1 + \left(\frac{\Delta R_2}{R_2}\right)\right] \quad (5)$$

By assuming (which is reasonable) that the "unforced" resistors (that is, when $\Delta R_{sens}=0$) are ideally matched, i.e. $R_1=R_2$, the following can be defined:
an "unforced" period $T_{osc\_0}$ of the $V_{osc}$ signal at a given reference temperature $Temp_{ref}$:

$$T_{osc\_0} = \frac{R_1}{K_c \cdot V_{sens}} = \frac{R_2}{K_c \cdot V_{sens}}$$

an "unforced" frequency $F_{osc\_0}$ of the $V_{osc}$ signal at a given reference temperature $Temp_{ref}$:

$$F_{osc\_0} = \frac{K_c \cdot V_{sens}}{R_1} = \frac{K_c \cdot V_{sens}}{R_2}$$

From Eq. (5), the sensitivity of the switched resistor sensor bridge (SRSB) may be expressed as:

$$\frac{\Delta T_{osc}}{T_{osc\_0}} = \left(\frac{\Delta R_1}{R_1}\right) - \left(\frac{\Delta R_2}{R_2}\right)$$

$$\frac{\Delta F_{osc}}{F_{osc\_0}} \approx \left(\frac{\Delta R_2}{R_2}\right) - \left(\frac{\Delta R_1}{R_1}\right) + \left[\left(\frac{\Delta R_1}{R_1}\right)^2 - \left(\frac{\Delta R_2}{R_2}\right)^2\right]$$

An offset may be generated in a switched resistor sensor bridge (SRSB) as exemplified herein due to a mismatch between "unforced" resistors $R_1$ and $R_2$:

$$R_1 = R_0 + \frac{\delta R}{2}$$

$$R_2 = R_0 - \frac{\delta R}{2}$$

The sensitivity of a switched resistor sensor bridge (SRSB) as exemplified herein may thus be expressed as:

$$\frac{\Delta T_{osc}}{T_{osc\_0}} = \left(\frac{\Delta R_1}{R_1}\right) - \left(\frac{\Delta R_2}{R_2}\right) + \frac{\delta R}{R_0} \cdot \left[1 + \frac{\left(\frac{\Delta R_1}{R_1}\right) + \left(\frac{\Delta R_2}{R_2}\right)}{2}\right] \quad (6)$$

$$\frac{\Delta F_{osc}}{F_{osc\_0}} \approx \left(\frac{\Delta R_2}{R_2}\right) - \left(\frac{\Delta R_1}{R_1}\right) + \left[\left(\frac{\Delta R_1}{R_1}\right)^2 - \left(\frac{\Delta R_2}{R_2}\right)^2\right] -$$

$$\frac{\delta R}{R_0} \cdot \left\{1 - \frac{\left(\frac{\Delta R_1}{R_1}\right) + \left(\frac{\Delta R_2}{R_2}\right)}{2} - \frac{\left[\left(\frac{\Delta R_1}{R_1}\right) + \left(\frac{\Delta R_2}{R_2}\right)\right]^2}{2}\right\}$$

If the temperature dependence of the resistors is modeled as:

$$\frac{\Delta R}{R} = \alpha_1 \cdot \Delta \text{Temp} + \alpha_2 \cdot (\Delta \text{Temp})^2 + \ldots \Delta \text{Temp} - \text{Temp Temp}_{ref}$$

the resistor mismatch may generate a temperature-dependent offset at the output of the switched resistor sensor bridge (SRSB):

$$\left(\frac{\Delta T_{osc}}{T_{osc\_0}}\right)_{offset} = \frac{\delta R}{R_0} \cdot [1 + \alpha_1 \cdot \Delta \text{Temp} + \alpha_2 \cdot (\Delta \text{Temp})^2 + \ldots] \quad (7)$$

$$\left(\frac{\Delta F_{osc}}{F_{osc\_0}}\right)_{offset} = -\frac{\delta R}{R_0} \cdot [1 - \alpha_1 \cdot \Delta \text{Temp} - \alpha_2 \cdot (\Delta \text{Temp})^2 + \ldots]$$

By way of comparison with a conventional Wheatstone bridge one may note that:
- a switched resistor sensor bridge (SRSB) may provide performance comparable with performance of a signal conditioning system based on a resistive Wheatstone bridge (WB) in terms of sensitivity, linearity and rejection of temperature dependence of resistivity,
- the current flowing in the switched-resistor branches SR1, SR2 may be of the order of a µA ($10^{-6}$ A) or below,
- the output may be in the form of periods/frequencies of signals rather than voltages,
- a switched resistor sensor bridge (SRSB) may exhibit a sensitivity of, for example, twice the sensitivity of a Wheatstone bridge,
- sensitivity of a switched resistor sensor bridge (SRSB) may be thermally compensated against thermal variations of resistivity,
- non-linearity in the resistive-to-frequency conversion is reduced if variations of resistivity are arranged symmetrically, for example, $(\Delta R_1/R_1) = -(\Delta R_2/R_2)$,
- the output $\Delta T_{osc}$ or $\Delta F_{osc}$ may be enhanced by adopting higher values for the "unforced" period $T_{osc\_0}$ or the "unforced" frequency $F_{osc\_0}$ thus making it possible to dispense with high voltage bias as required in a Wheatstone bridge,
- resistivity mismatch produces temperature-dependent offset,
- signal amplification may not be required in a switched resistor sensor bridge (SRSB),
- discrete time filtering may be used to enhance the output signal-to-noise ratio, for example, by time windowing and averaging,
- system architecture facilitates integration.

Accuracy of measurements performed by means of a switched resistor sensor bridge (SRSB) as exemplified herein may be affected by the noise in the time/frequency estimation of the $V_{osc}$ signal.

Figure 7:
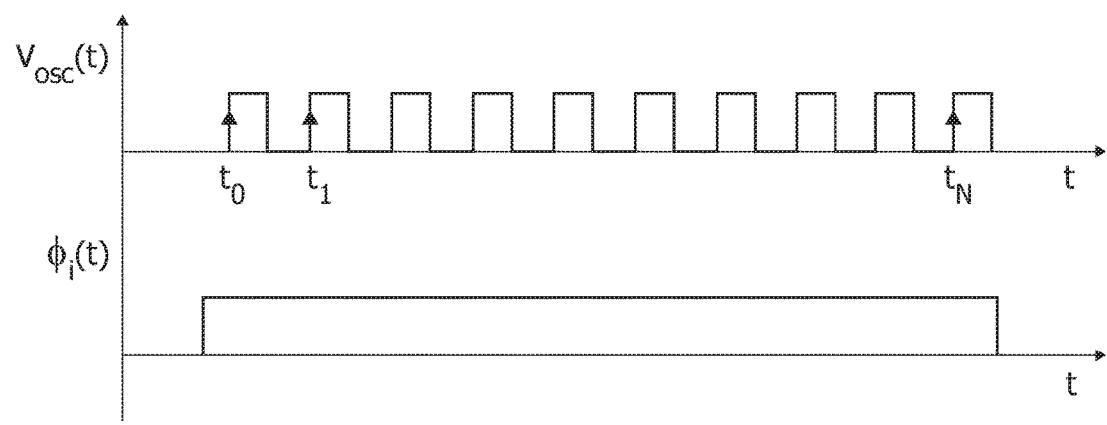

FIG. 7 is exemplary of the possibility of defining, in one or more embodiments, a N-cycle "count window":

$$\Delta T_w(N) = \sum_{i=0}^{N-1} (t_{i+1} - t_i) \quad (8)$$

The measurement of, for example, the period of the (for example, current-controlled) oscillator 100 based on such a N-cycle Count Window may be expressed as:

$$T_{osc\_w} = \frac{\Delta T_w(N)}{N} \quad (9)$$

As exemplified in FIG. 7 a N-cycle count window $\Delta T_W(N)$ may be a discrete stochastic process due to jitter, i.e., the uncertainty on transitions time $t_i$, generated by noise sources. The jitter is an accumulative process because the time uncertainty increase with measurement interval $\Delta T_W$; hence, it may increase with the number of cycles N.

From Eq. (9), the standard deviation of the N-cycle count window process may be defined as:

$$\sigma_{T_{osc\_w}} = \frac{\sigma_{\Delta T_w}}{N} \quad (10)$$

FIG. 8 is exemplary of measured RMS time jitter of an oscillator. Specifically, FIG. 8 shows by way of example the RMS jitter of an oscillator versus the measurement time on a log-log plot (see, for example, J. McNeill: "Jitter in ring oscillators," IEEE J. Solid-State Circuits, vol. 32, pp. 870-879, June 1997, incorporated by reference).

The standard deviation $\sigma_{\Delta TW}$ of a N-cycle count window process may be characterized in two different cases, for example:
- a "short" N-cycle count window; and
- a "long" N-cycle count window.

In the case of a "short" N-cycle count window, the random process is white and dominated by uncorrelated noise sources, which are prevalently the thermal noise sources in the controlled oscillator 100.

The RMS jitter may be expressed as $\sigma_{\Delta Tw}=k\sqrt{\Delta Tw}$ $\sigma_{\Delta T_W}=\kappa\sqrt{\Delta T_W}$ (curve (A) in FIG. 8—see, for example, J. McNeill, already cited), hence from Eq. (8) and Eq. (10):

$$\sigma_{T_{osc\_w}} = \frac{\kappa\sqrt{\Delta T_w(N)}}{N} \propto \frac{1}{\sqrt{N}} \quad (11)$$

In the case of a "long" N-cycle count window, the random process is dominated by correlated noise sources, such as, for example:
- the substrate and supply noise sources and the low-frequency noise sources, such us the 1/f noise, in the (for example, current controlled) oscillator 100,
- the noise in the (for example, current) control signal of the oscillator 100.

The RMS jitter is $\sigma_{\Delta Tw}=\zeta\Delta Tw$ $\sigma_{\Delta T_W}=\zeta\zeta\Delta T_W$ (curve (B) in FIG. 8: see, for example, C. Liu et al.: "Jitter in oscillators with 1/f noise sources," in Proc. IEEE Int. Symp. Circuits and Systems (ISCAS), 2004, pp. 773-776 or A. A. Abidi: "Phase Noise and Jitter in CMOS Ring Oscillators," IEEE J. Solid-State Circuits, vol. 41, pp. 1803-1816, August 2006).

Hence from Eq. (8) and Eq. (10):

$$\sigma_{T_{osc\_w}} = \frac{\zeta \Delta T_w(N)}{N} \approx const \quad (12)$$

In such case, the standard deviation is almost independent of the duration (or number of cycles N) of the N-cycle count window.

Eqs. (11) and (12) show that accuracy in the measurement of $T_{osc}$ may be enhanced by enlarging the N-cycle count window up to an upper value where correlated noise sources start to dominate in the time jitter process.

In one or more embodiments accuracy may be increased with measurements averaged over M phases, as exemplified in FIG. 9, which shows a measurement of, for example, $T_{osc}$ averaged over M phases, $1^{st}$ PH to $M^{th}$ PH.

Figure 10:
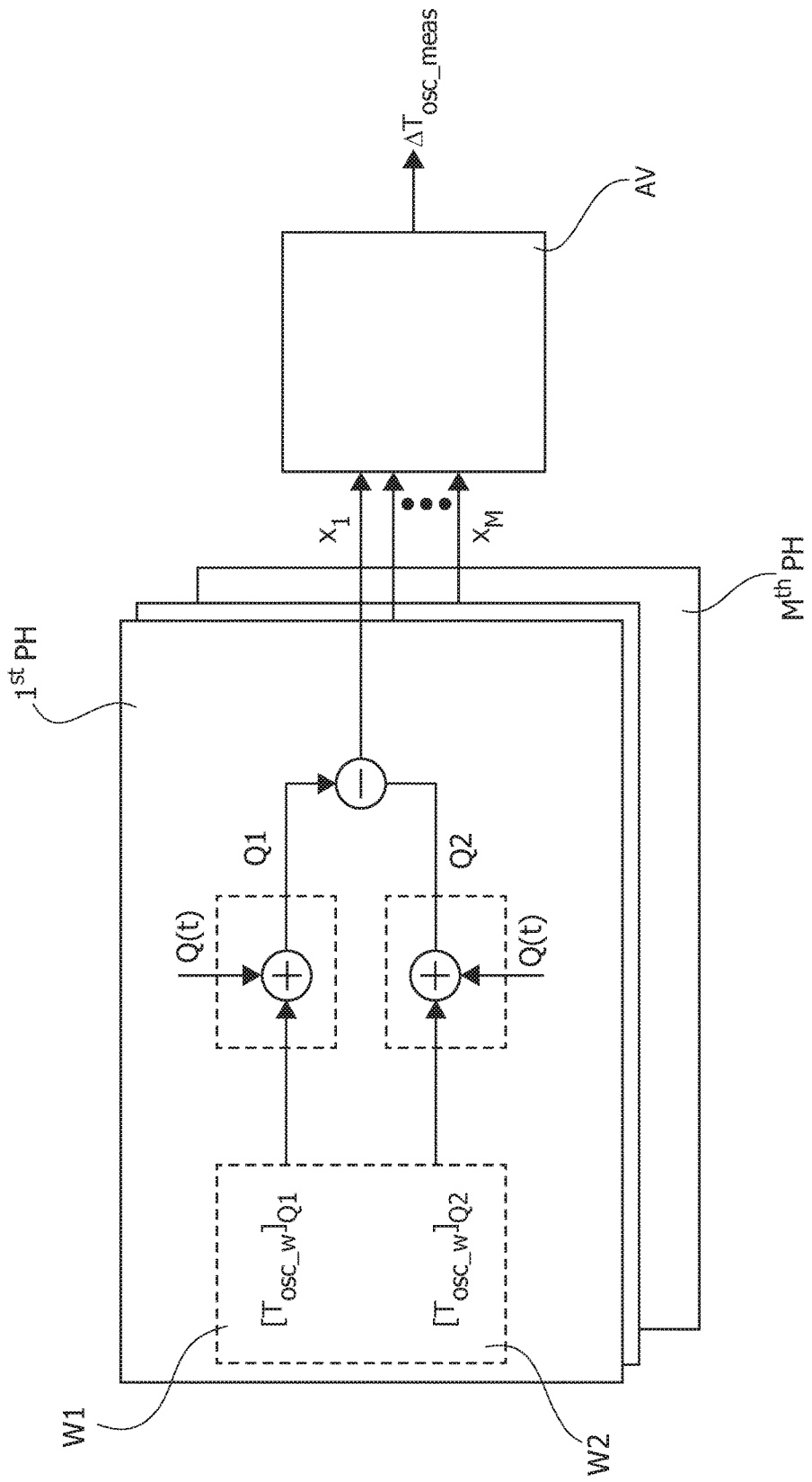
FIG. 10 is exemplary of digital conversion in one or more embodiments.

FIG. 10 schematically represents the digitalization process based on the N-cycle count windows W1 and W2 (Eqs. (8) and (9)) followed by quantization Q1, Q2 and the M-averaging AV over M phases (as exemplified in FIG. 9).

For instance, with the following definitions:

$$[T_{osc\_w}]_{\phi_1} = \frac{[T_{osc\_w}]_{\phi_1}}{N}$$

$$[T_{osc\_w}]_{\phi_2} = \frac{[T_{osc\_w}]_{\phi_2}}{N}$$

the period of the oscillator 100 estimated during the i-th phase,

Q(t) the quantization noise of the analog-to-digital conversion, the output may be represented as the discrete process $\Delta T_{osc\_meas}$, which represents the measure of the "real" value of $\Delta T_{osc}$ given by Eq. (5).

The mean value of the process $\Delta T_{osc\_meas}$ may be expressed as:

$$E\{\Delta T_{osc\_meas}\} = \frac{E\{[\Delta T_w(N)]_{\phi_1}\} - E\{[\Delta T_w(N)]_{\phi_2}\}}{N \cdot M} \quad (13)$$

The accuracy of the measurement of $\Delta T_{osc}$ is related to the standard deviation of the process $\Delta T_{osc\_meas}$:

$$\sigma_{\Delta T_{osc\_meas}} = \sqrt{\frac{2}{M}} \cdot \sqrt{\left(\frac{\sigma_{\Delta T_w}}{N}\right)^2 + (\sigma_q)^2} \quad (14)$$

where:
$\sigma_{\Delta Tw}$ is the standard deviation of the N-cycle count window process
$\sigma_q$ is the standard deviation of quantization process.

By dual reasoning, if a N-cycle count window is used to provide a measurement of a differential oscillation frequency $\Delta F_{osc}$, the standard deviation of the corresponding discrete process $\Delta F_{osc\_meas}$ may be (approximately) given by:

$$\sigma_{\Delta F_{osc\_meas}} \approx \frac{\sigma_{\Delta T_{osc\_meas}}}{E\{\Delta T_{osc\_meas}\}^2} \quad (15)$$

A number of possible implementations of one or more embodiments will now be described by way of example only.

Figure 11:
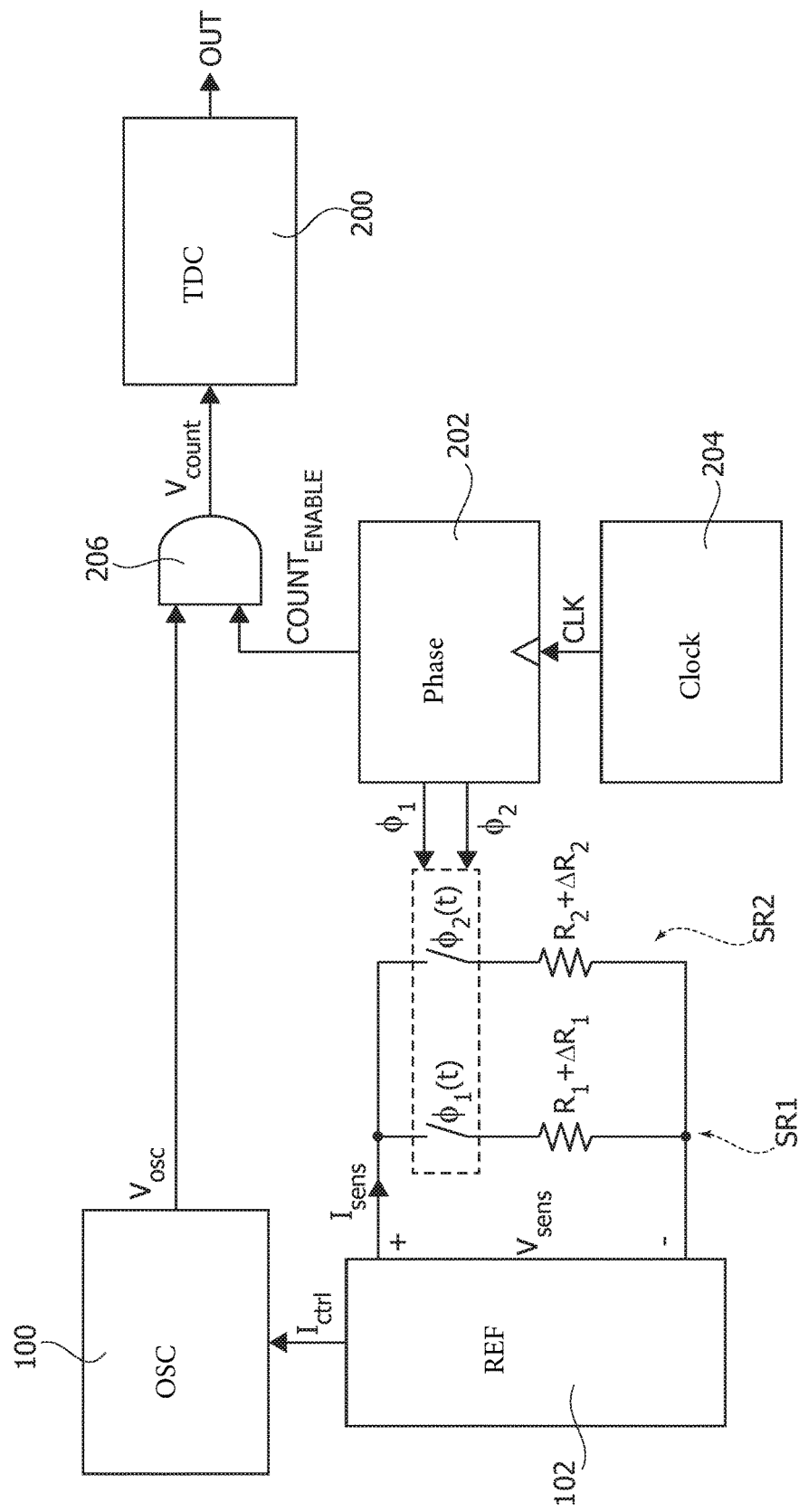
FIG. 11 is a block diagram exemplary of one or more embodiments.

For instance, FIG. 11 is exemplary of a switched-resistor sensor bridge (SRSB) as discussed in the foregoing with asynchronous N-cycle count window.

In this exemplary implementation, pulses generated by the (for example, current-controlled) oscillator 100 may be processed by a time-to-digital converter and processing block (TDC) 200 to provide an output signal OUT.

A control and phase generator (Phase) block 202, clocked by a clock generator (Clock) 204, may control the N-cycle count window duration by means of a $COUNT_{ENABLE}$ control signal synchronized with the generated phases of turning the switches $\Phi_1$ and $\Phi_2$ on and off as discussed previously.

In one or more embodiments, the $COUNT_{ENABLE}$ signal may not be synchronized with the $V_{osc}$ pulses.

In one or more embodiments, the $COUNT_{ENABLE}$ signal and the $V_{osc}$ pulses may be fed to an AND gate 206 to produce a signal $V_{count}$ for feeding to the time-to-digital converter and processing block 200.

Figure 12:
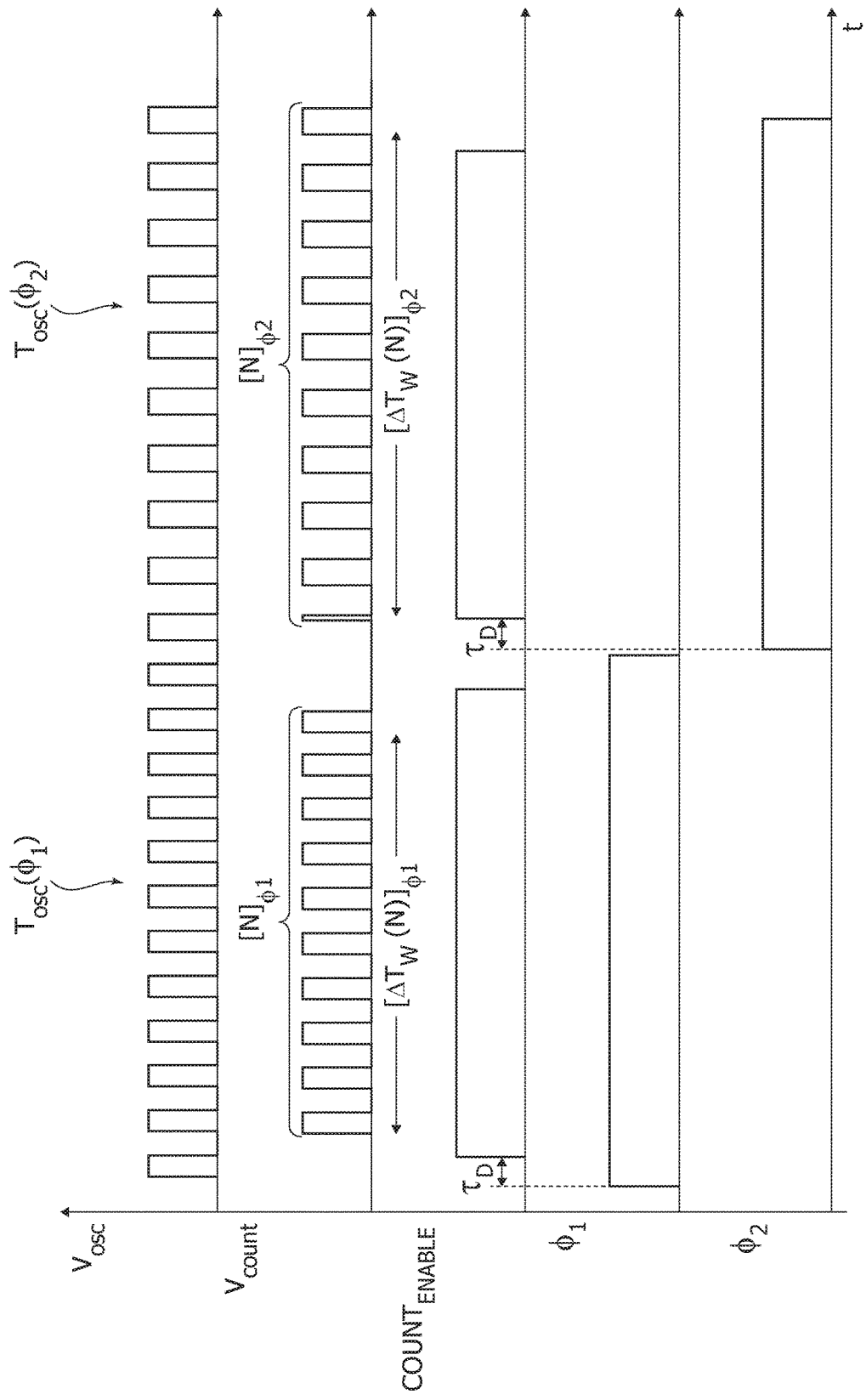
FIG. 12 includes time diagrams exemplary of signals in one or more embodiments.

The time diagram of FIG. 12 is exemplary of operation of such a switched-resistor sensor bridge (SRSB) with asynchronous N-cycle count window.

In FIG. 12, for a given i-th phase $\Phi_i$:
- the control and phase generator block enables the oscillator 100 to oscillate at $T_{osc}(\Phi_i)$,
- the $COUNT_{ENABLE}$ signal, generated by the control and phase generator block 202, enables pulses of $V_{osc}$ signal to pass through the AND gate 206. A delay $\tau_D$ between the rising edges of $\Phi_i$ and the $COUNT_{ENABLE}$ allows the oscillator 100 to settle to stable oscillations.

In one or more embodiments, the on-time duration of $COUNT_{ENABLE}$ signal may be fixed for all $\Phi_i$ phases.

Both the number of passed pulses $[N]_{\Phi_i}$ and the duration of the window $[\Delta T_W(N)]_{\Phi_i}$ may be measured by the time-to-digital converter and processing block 200 in order to estimate the oscillator period as:

$$[T_{osc\_w}]_{\phi_i} = \frac{[\Delta T_w(N)]_{\phi_i}}{[N]_{\phi_i}} \quad (16)$$

Figure 13:
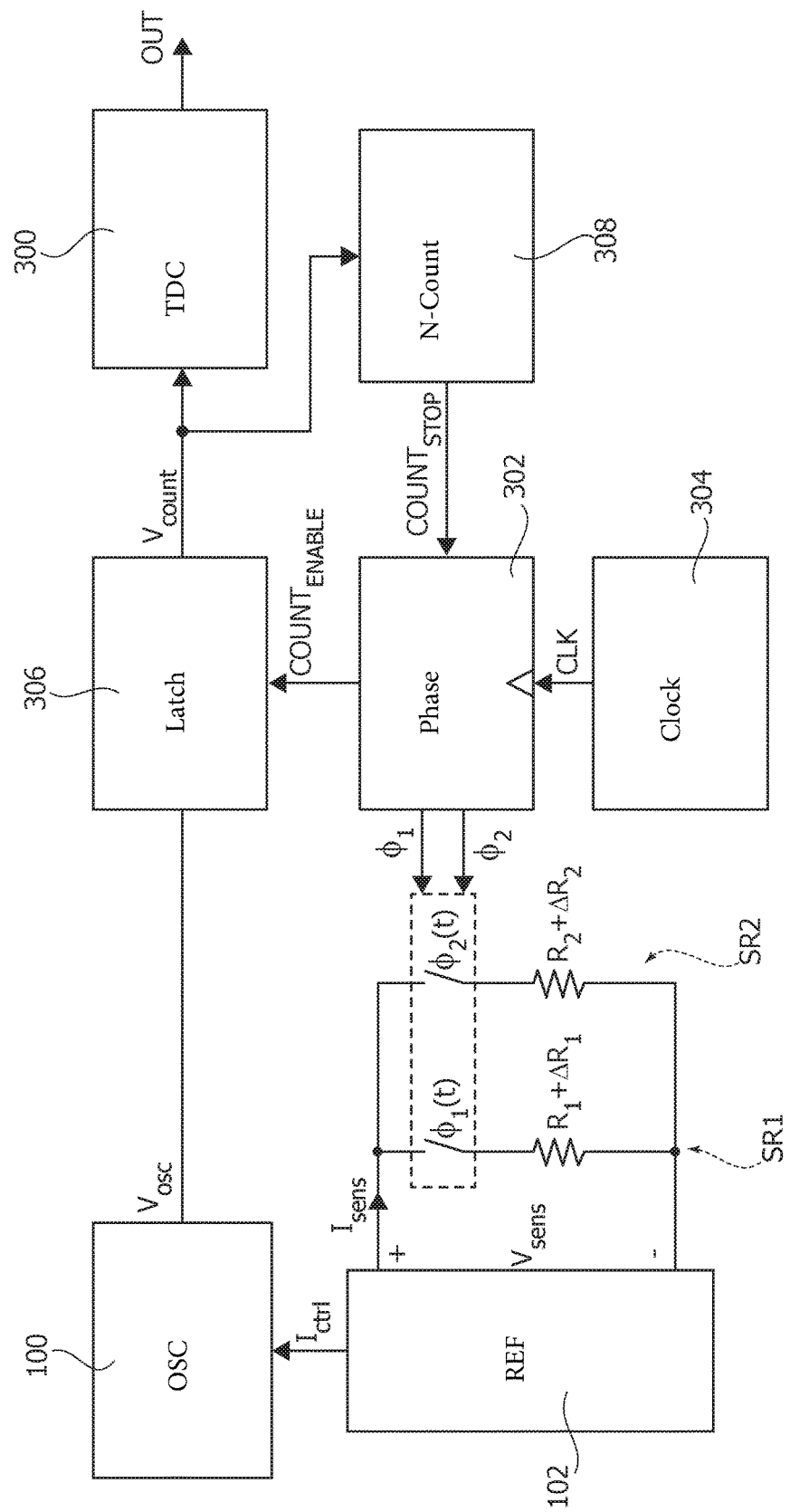
FIG. 13 is a block diagram exemplary of one or more embodiments.

For instance, FIG. 13 is exemplary of a switched-resistor sensor bridge (SRSB) as discussed in the foregoing with synchronous N-cycle count window.

In this implementation, a N-cycle count window may be synchronous with the $V_{osc}$ pulses. A control and phase generator block 302 clocked by a clock generator 304 controls the duration of N-cycle count window by means of a COUNT$_{ENABLE}$ control signal synchronized with the generated phases $\Phi_1$ and $\Phi_2$.

In one or more embodiments, generation of the N-cycle count window may be implemented by a latched gate block 306 which receives the $V_{osc}$ signal and forwards a corresponding signal $V_{count}$ to a time-to-digital converter block (TDC) 300 where digitalization and processing (i.e., time differences) may be performed.

An N-counter block (N-count) 308 sensitive to the $V_{count}$ signal is provided configured to generate a COUNT$_{STOP}$ signal to be fed to the control and phase generator block (Phase) 302.

Figure 14:
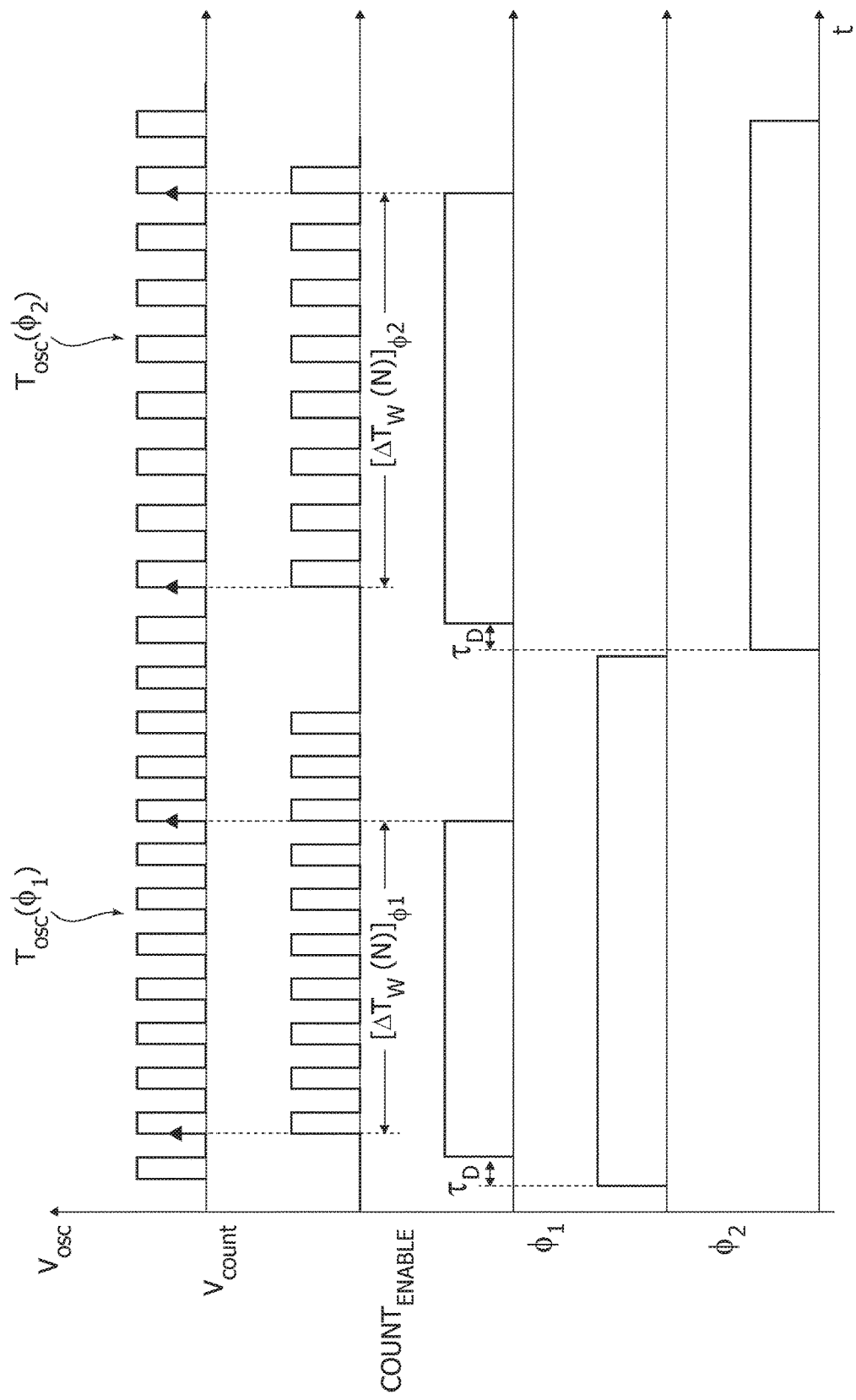
FIG. 14 includes time diagrams exemplary of signals in one or more embodiments.

The time diagram of FIG. 14 is exemplary of operation of such a switched-resistor sensor bridge (SRSB) with synchronous N-Cycle count window (in the example shown N=7).

Referring to FIG. 14, for a given i-th phase $\Phi_i$:
the control and phase generator block 302 enables the oscillator 100 to oscillate at $T_{osc}(\Phi_i)$,
the control and phase generator block 302 enables, by means of the COUNT$_{ENABLE}$ signal, the latched gate block (latch) 306.

Thanks to latching, the $V_{osc}$ pulses start to pass at the first rising edge after COUNT$_{ENABLE}$ signal has gone to high.

A delay $\tau_D$ between the rising edges of $\Phi_i$ and COUNT$_{ENABLE}$ allows the oscillator 100 to settle to stable oscillations.

In one or more embodiments, the signal $V_{count}$ is fed back to the N-counter block 308. As a result of a N-th pulse of $V_{count}$ being counted, the N-counter 308 feeds a COUNT$_{STOP}$ signal to the control and phase generator block 302 that drives the COUNT$_{ENABLE}$ signal to low level.

The latched gate block is thus disabled at the falling edge of the N-th pulse of $V_{count}$, until the current phase $\Phi_i$ expires and a subsequent phase $\Phi_{i+1}$ is started. In one or more embodiments, the duration of the window $[\Delta T_W(N)]_{\Phi_i}$ may be measured by the time-to-digital converter and processing block 300 to estimate the oscillator period (with N known a-priori, as set in the N-counter block 308) as:

$$[T_{osc\_w}]_{\Phi_i} = \frac{[\Delta T_W(N)]_{\Phi_i}}{N} \quad (17)$$

Figure 15:
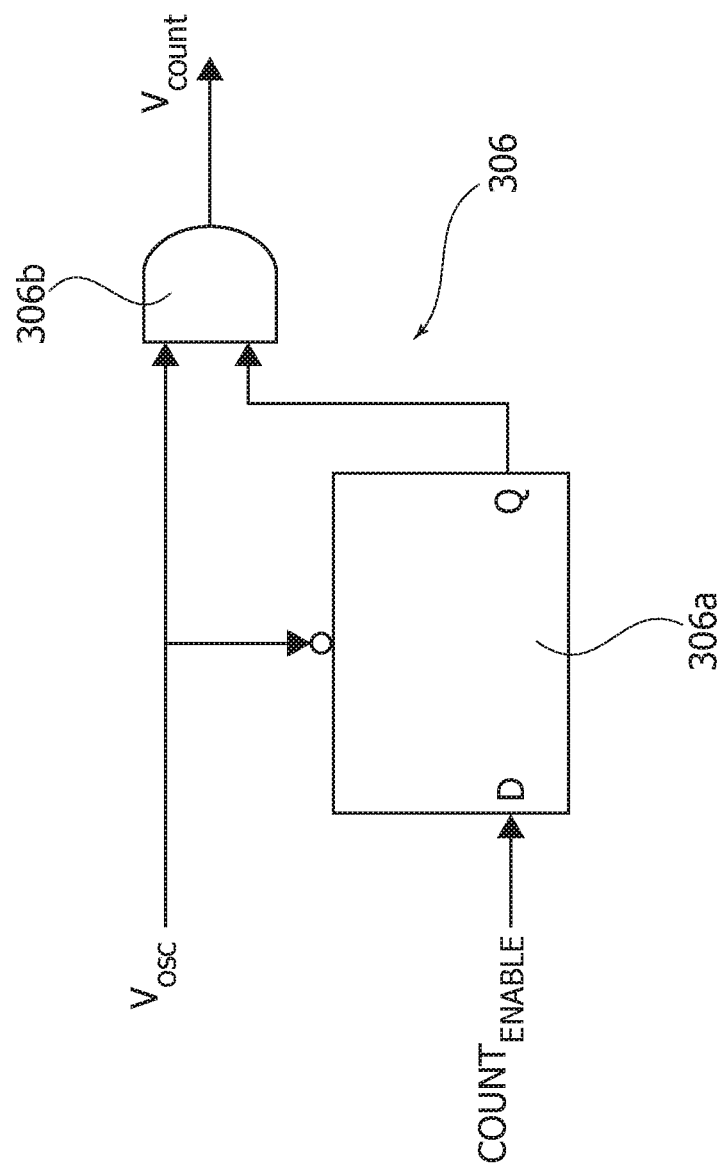
FIG. 15 is exemplary of possible details of one or more embodiments.

The block diagram of FIG. 15 is exemplary of a possible implementation of the latched gate block, including, for example:
a D-LATCH 306a enabled by $V_{osc}$ and receiving the COUNT$_{ENABLE}$ signal at its D input, and
an AND gate 306b having $V_{osc}$ and the output Q from the D-LATCH 306a as inputs.

Figure 16:
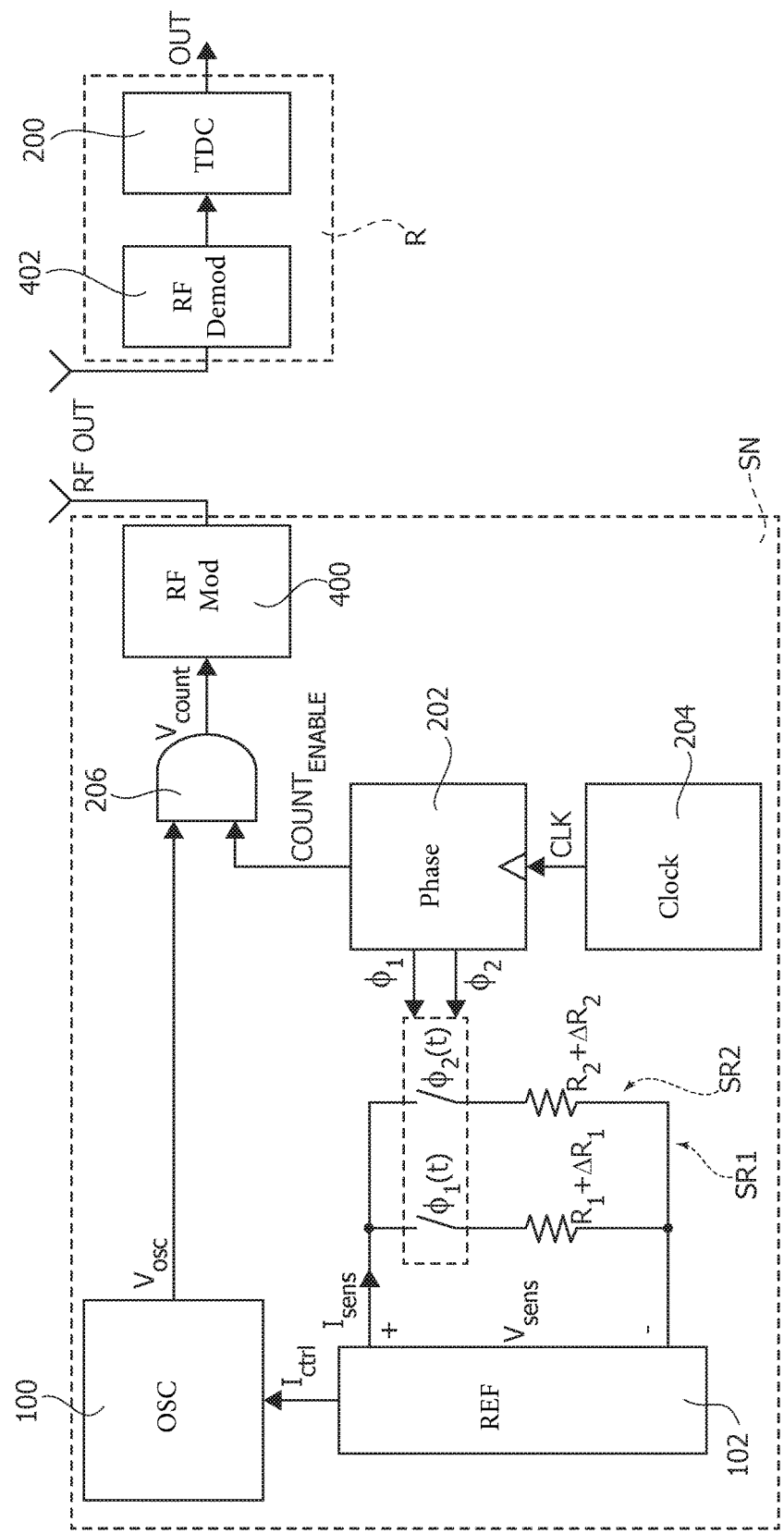
FIG. 16 is a block diagram exemplary of one or more embodiments.

FIG. 16 is exemplary of a switched-resistor sensor bridge (SRSB) as discussed in the foregoing with asynchronous N-cycle count window and wireless digital conversion in a reader device.

Figure 17:
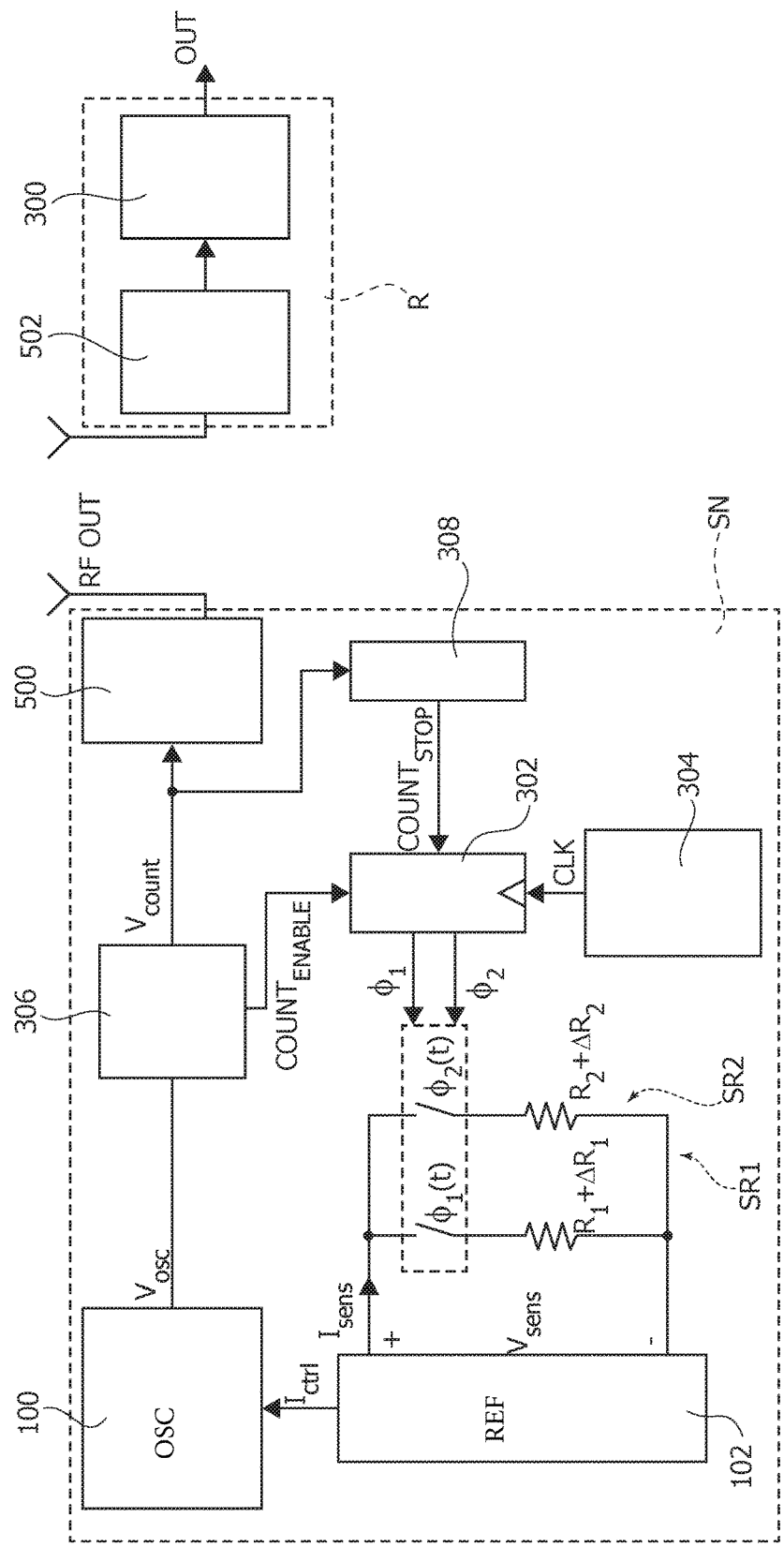
FIG. 17 is a block diagram exemplary of one or more embodiments.

FIG. 17 is exemplary of a switched-resistor sensor bridge (SRSB) as discussed in the foregoing with synchronous N-cycle count window and wireless digital conversion in a reader.

In both FIGS. 16 and 17 parts or elements (for example, blocks) corresponding to parts or elements already discussed in the foregoing (for example, in connection with FIGS. 11 and 13) are indicated with the same reference numerals, thus making it unnecessary to describe them again.

For both implementations of FIGS. 16 and 17 a switched-resistor sensor bridge (SRSB) may be coupled in a wireless sensor network (including, for example, a sensor node SN) wherein signals generated by the sensor can be digitized and processed in a reader R.

In one or more embodiments, the sensor node SN may be active, semi-active or passive.

For instance, in one or more embodiments, data from the sensor SN may be transmitted to the reader R by, for example, carrier-based (for example, RF) TX modulation or backscattering modulation.

To that effect, in one or more embodiments, the sensor node SN may include a transmitter (for example, a RF modulator) 400, 500 configured to receive the signal $V_{count}$ and transmit it to the reader R.

The reader R may in turn include a receiver 402, 502 (for example, a RF demodulator) to receive the signal transmitted and forward it to a cascaded time-to-digital converter and processing block 200, 300.

One or more embodiments may thus provide:
differential measurement of pairs of resistive sensors by a switching resistor technique,
resistive-to-time/resistive-to-frequency conversion,
time-discrete filtering by N-cycle count windowing and averaging,
time-to-digital/frequency-to-digital conversion.

By way of example, a switched-resistor sensor bridge (SRSB) with asynchronous N-cycle count window and wireless digital conversion at a reader (see, for example, FIG. 16) may be implemented in a CMOS silicon integrated pressure sensor for health monitoring of concrete structures (SHM) by resorting to 0.13-μm HCMOS9A ST Microelectronics technology, with wafer plane (001), with a membrane area of 500×500 μm$^2$, thickness=100 μm and N-type diffused piezoresistors, <100> oriented. Exemplary parameters for such an implementation may include:
$F_{osc}$ (nominal)=1 MHz
N-cycle count window=256
M-phases=20
$I_{sens}$ about 1.7 μA.

As indicated, one or more embodiments (see, for example, FIG. 18) may include plural pairs of switched resistive branches SR1i and SR2i (for example, SR$_{11}$, SR$_{22}$ to SR$_{1N}$, SR$_{2N}$) in series or parallel configurations. The various aspects of embodiments discussed previously by referring (for the sake of simplicity and ease of explanation) to embodiments including only one pair of switched resistive branches SR1 and SR2 apply mutatis mutandis to embodiments including plural pairs of switched resistive branches.

One or more embodiments may thus provide a sensor including:
one (see, for example, FIG. 5) or more (see, for example, FIG. 18) resistive sensing bridges including a first sensing branch (for example, SR1) with a first sensing resistor (for example, R$_1$) and a second sensing branch (for example, SR2) with a second sensing resistor (for example, R$_2$), said sensing resistors (for example, R$_1$, R$_2$) having variable (for example, ΔR$_1$, ΔR$_2$) resistance values in response to a change in a physical variable sensed, an oscillator (for example, 100) configured for generating an oscillation signal (for example, $V_{osc}$), the oscillator controlled by an oscillator control signal (for example, $I_{ctrl}$) wherein the frequency (for example, $F_{osc}$) resp. the period (for example, $T_{osc}$) of the oscillation signal is a function of said control signal, a sensor reference module (for example, 102) configured for generating said oscillator control signal as a function of the resistance value of a resistor coupled therewith, the sensor reference module couplable (see, for example, $\Phi_1$, $\Phi_2$) with said first sensing resistor or, alternatively, with said second sensing resistor, a processing circuit (for example, 202, 204 or 206; 302, 304, 306, 308) coupled to said oscillator to provide a sensor signal (for example, $V_{count}$) indicative of the frequency or the period of said oscillation signal, said sensor signal having first (for example, $T_{osc}(\Phi_1)$; $[\Delta T_W(N)]_{\Phi_1}$) and second (for example, $T_{osc}(\Phi_2)$; $[\Delta T_W(N)]_{\Phi_2}$) values with the sensor reference module coupled with the first sensing resistor and with the second sensing resistor, respectively, wherein said first and second values are (jointly) indicative of said sensed physical variable.

That is, in one or more embodiments a value for the sensed physical variable may be derived as a function of said first and second values.

One or more embodiments may thus include a converter circuit (for example, 200, 300) configured for calculating an algebraic expression (for example, addition, subtraction or difference, multiplication, division or exponentiation), optionally the difference, of said first and second values wherein said algebraic expression is indicative of said sensed physical variable.

In one or more embodiments such an algebraic expression of the frequency or the period of the oscillation signal with the sensor reference module coupled with the first sensing resistor and with the second sensing resistor, respectively, is independent by the temperature dependence of resistivity of said sensing resistors.

In one or more embodiments, said converter circuit may be configured for averaging said algebraic expression over a plurality of M conversion phases.

In one or more embodiments, said sensor reference module may be configured for providing:
- a controlled, sensor-independent reference signal (for example, $V_{sens}$) to the first sensing branch and the second sensing branch of said resistive sensing bridge, and/or
- a sensor-dependent reference signal (for example, $I_{sens}$) to the first sensing branch and the second sensing branch of said resistive sensing bridge, said oscillator control signal being optionally a function of said sensor-dependent reference signal.

In one or more embodiments, said first sensing branch and said second sensing branch may each include a sensing resistor coupled with a switch (for example, $\Phi_1$, $\Phi_2$) controllable (for example, 202) for coupling said sensing resistor with the sensor reference module.

In one or more embodiments, said processing circuit may include counting circuitry for detecting the frequency or the period of the oscillation signal from said controlled oscillator over a counting window (for example, $[N]\Phi_1$, $[N]\Phi_2$) including a plurality of N cycles of said oscillation signal.

In one or more embodiments, said counting circuitry may include a latch module configured for synchronizing said counting window with said oscillation signal.

In one or more embodiments, said counting circuitry may include a delay (for example, $\tau_D$) in starting detecting said oscillation signal to permit said controlled oscillator to settle to stable oscillations.

One or more embodiments may include a plurality of said resistive sensing bridges (see, for example, FIG. 18) including a first sensing branch (for example, $SR_{11}, \ldots, SR_{1N}$) with a first sensing resistor (for example, $R_{11}, \ldots, R_{1N}$) and a second sensing branch (for example, $SR_{21}, \ldots, SR_{2N}$) with a second sensing resistor (for example, $R_{21}, \ldots, R_{2N}$).

In one or more embodiments, said plurality of resistive sensing bridges may be arranged in series or in parallel configuration.

In one or more embodiments, said sensing resistors may include piezoresistive resistors.

In one or more embodiments, the sensor may include a MEMS sensor (for example, S).

One or more embodiments, may include a transmitter (for example, 400, 500) configured for generating from said sensor signal ($V_{count}$) a readout signal indicative of said sensed physical variable.

One or more embodiments may provide a sensor system (see, for example, SN, R in FIGS. 16 and 17), including:
- a sensor node (for example, SN) including a sensor according to one or more embodiments, and
- a reader (for example, R) including a receiver (for example, 402, 502) couplable to said transmitter for receiving from said transmitter said readout signal indicative of said sensed physical variable.

In one or more embodiments, said reader may include converter circuitry (see, for example, 200, 300 in FIGS. 16 and 17) configured for converting said readout signal into a, optionally digital, output signal (for example, OUT) indicative of said sensed physical variable.

In one or more embodiments, said reader (R) may include a converter circuit (for example, 200, 300 in FIGS. 16 and 17) configured for calculating an algebraic expression, optionally the difference, of said first and second values wherein said algebraic expression is indicative of said sensed physical variable.

In one or more embodiments, said converter circuit may be configured for averaging said algebraic expression over a plurality of M conversion phases.

One or more embodiments may provide a method of sensing a physical variable, the method including:
- providing at least one resistive sensing bridge including a first sensing branch with a first sensing resistor and a second sensing branch with a second sensing resistor, said sensing resistors having variable resistance values in response to a change in a physical variable sensed,
- generating an oscillation signal wherein the frequency or the period of the oscillation signal is a function of an oscillator control signal, wherein the method includes generating said oscillator control signal as a function of the resistance value of a resistor selected alternatively between said first sensing resistor and said second sensing resistor,
- processing said oscillation signal to provide a sensor signal indicative of the frequency or the period of said oscillation signal, said sensor signal having first and second values with said oscillator control signal generated as a function of the resistance value of said first sensing resistor and of said second sensing resistor, respectively, wherein said first and second values are (jointly) indicative of said sensed physical variable.

Without prejudice to the underlying principles, the details and the embodiments may vary, even significantly, with respect to what has been disclosed by way of example only in the foregoing, without departing from the extent of protection.

The extent of protection is defined by the annexed claims.

The invention claimed is:

1. A sensor, including:
at least one resistive sensing bridge including a first sensing branch with a first sensing resistor and a second sensing branch with a second sensing resistor, said first and second sensing resistors having variable resistance values in response to a change in a physical variable sensed;
an oscillator configured for generating an oscillation signal, the oscillator controlled by an oscillator control signal wherein a frequency or a period of the oscillation signal is a function of said oscillator control signal;
a sensor reference module alternatingly coupled to the first sensing resistor and the second sensing resistor, the sensor reference module configured for generating said oscillator control signal as a function of the resistance value of said first sensing resistor or said second sensing resistor; and
a processing circuit coupled to said oscillator to provide a sensor signal indicative of the frequency or the period of said oscillation signal, said sensor signal having first and second values with the sensor reference module coupled with the first sensing resistor and with the second sensing resistor, respectively, wherein a combination of said first and second values is indicative of said sensed physical variable.

2. The sensor of claim 1, including a converter circuit configured to calculate an algebraic expression of said first and second values that is indicative of said sensed physical variable.

3. The sensor of claim 2, wherein the algebraic expression is an algebraic difference.

4. The sensor of claim 2, wherein said converter circuit is configured to average said algebraic expression over a plurality of M conversion phases.

5. The sensor of claim 1, including said sensor reference module configured to provide at least one of:
a controlled, sensor-independent reference signal to the first sensing branch and the second sensing branch of said resistive sensing bridge; and
a sensor-dependent reference signal to the first sensing branch and the second sensing branch of said resistive sensing bridge, said oscillator control signal being a function of said sensor-dependent reference signal.

6. The sensor of claim 1, wherein said first sensing branch and said second sensing branch each include a sensing resistor coupled with a switch controllable for coupling said sensing resistor with the sensor reference module.

7. The sensor of claim 1, wherein said processing circuit includes counting circuitry for detecting the frequency or the period of the oscillation signal from said controlled oscillator over a counting window including a plurality of N cycles of said oscillation signal.

8. The sensor of claim 7, wherein said counting circuitry includes a latch module configured to synchronize said counting window with said oscillation signal.

9. The sensor of claim 7, wherein said counting circuitry includes a delay in starting detecting said oscillation signal to permit said controlled oscillator to settle to stable oscillations.

10. The sensor of claim 1, including a plurality of said resistive sensing bridges which include the first sensing branch with the first sensing resistor and the second sensing branch with the second sensing resistor.

11. The sensor of claim 10, wherein said plurality of said resistive sensing bridges are connected in one of a series configuration or a parallel configuration.

12. The sensor of claim 1, wherein said first and second sensing resistors include piezoresistive resistors.

13. The sensor of claim 1, wherein the sensor include a MEMS sensor.

14. The sensor of claim 1, including a transmitter configured to generate from said sensor signal a readout signal indicative of said sensed physical variable.

15. The sensor of claim 14, further including a reader including a receiver couplable to said transmitter for receiving from said transmitter said readout signal indicative of said sensed physical variable.

16. The sensor of claim 15, wherein said reader includes converter circuitry configured for converting said readout signal into a preferably digital output signal indicative of said sensed physical variable.

17. The sensor of claim 16, wherein said reader includes a converter circuit configured to calculate an algebraic expression of said first and second values that is indicative of said sensed physical variable.

18. The sensor of claim 17, wherein said algebraic expression is an algebraic difference.

19. The sensor of claim 17, wherein said converter circuit is configured to average said algebraic expression over a plurality of M conversion phases.

20. A method of sensing a physical variable, including:
providing at least one resistive sensing bridge including a first sensing branch with a first sensing resistor and a second sensing branch with a second sensing resistor, said first and second sensing resistors having variable resistance values in response to a change in a physical variable sensed;
generating an oscillation signal wherein a frequency or a period of the oscillation signal is a function of an oscillator control signal;
generating said oscillator control signal using a sensor reference module alternatingly coupled to said first sensing resistor and said second sensing resistor, said oscillator control signal being a function of the resistance value of a resistor selected alternatively between said first sensing resistor and said second sensing resistor; and
processing said oscillation signal to provide a sensor signal indicative of the frequency or the period of said oscillation signal, said sensor signal having first and second values with said oscillator control signal generated as a function of the resistance value of said first sensing resistor and of said second sensing resistor, respectively, wherein said first and second values are indicative of said sensed physical variable.

* * * * *

UNITED STATES PATENT AND TRADEMARK OFFICE
CERTIFICATE OF CORRECTION

PATENT NO. : 10,393,601 B2
APPLICATION NO. : 15/437615
DATED : August 27, 2019
INVENTOR(S) : Santo Alessandro Smerzi Page 1 of 2

It is certified that error appears in the above-identified patent and that said Letters Patent is hereby corrected as shown below:

In the Specification

At Column 8, Line 55, please replace the equation:

[[ $T_{osc\_0} = \dfrac{R_1}{K_c \cdot V_{sens}} = \dfrac{R_2}{K_c \cdot V_{sens}}$ ]]

With the equation:

-- $T_{osc\_0} = \dfrac{R_1}{K_c \cdot V_{sens}} = \dfrac{R_2}{K_c \cdot V_{sens}}$ --.

At Column 9, Line 35, please replace the equation:

[[ $\dfrac{\Delta R}{R} = \sigma_1 \cdot \Delta Temp + \alpha_2 \cdot (\Delta Temp)^2 + \ldots \Delta Temp - Temp\, Temp_{ref}$ ]]

With the equation:

-- $\dfrac{\Delta R}{R} = \sigma_1 \cdot \Delta Temp + \alpha_2 \cdot (\Delta Temp)^2 + \ldots \Delta Temp = Temp - Temp_{ref}$ --.

At Column 11, Line 50, please replace the equation:

[[ $[T_{osc\_w}]_{\phi_i} = \dfrac{[T_{osc\_w}]_{\phi_i}}{N}$ ]]

With the equation:

-- $[T_{osc\_w}]_{\phi_i} = \dfrac{[\Delta T_w(N)]_{\phi_i}}{N}$ --.

At Column 11, Line 51, please replace the equation:

[[ $[T_{osc\_w}]_{\phi_i} = \dfrac{[T_{osc\_w}]_{\phi_i}}{N}$ ]]

Signed and Sealed this
Tenth Day of November, 2020

Andrei Iancu
*Director of the United States Patent and Trademark Office*

With the equation:

-- $[T_{osc\_w}]_{\phi_i} = \frac{[\Delta T_w(N)]_{\phi_i}}{N}$ --.